United States Patent
Bennett et al.

(10) Patent No.: US 7,316,288 B1
(45) Date of Patent: Jan. 8, 2008

(54) ALL TERRAIN VEHICLE WITH MULTIPLE STEERING MODES

(75) Inventors: Jeff Bennett, Roseau, MN (US); Brett Gass, Forest Lake, MN (US); Roger Hapka, Columbus, IN (US); Louis Brady, Roseau, MN (US); Ryan Lovold, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/639,411

(22) Filed: Aug. 12, 2003

Related U.S. Application Data

(60) Provisional application No. 60/483,685, filed on Jun. 30, 2003, provisional application No. 60/459,665, filed on Apr. 2, 2003, provisional application No. 60/442,697, filed on Jan. 27, 2003.

(51) Int. Cl.
*B62D 6/00* (2006.01)

(52) U.S. Cl. .................. 180/413; 180/204; 701/41

(58) Field of Classification Search .............. 180/6.5, 180/65.1, 315, 333, 414, 415, 908, 204, 404–413, 180/445, 6.48; 701/35–38, 69–71, 41, 42
See application file for complete search history.

(56) References Cited

U.S. PATENT DOCUMENTS

| | | | |
|---|---|---|---|
| 2,824,749 A | 2/1958 | Yasuda | |
| 3,282,366 A | 11/1966 | Sprague | |
| 3,596,730 A | 8/1971 | Cecce | |
| 3,888,328 A | 6/1975 | Leiber | |
| 3,897,846 A | 8/1975 | Inoue | |
| 3,912,031 A | 10/1975 | Goulet | |
| 3,933,215 A | 1/1976 | Scheuerle | |
| 4,024,968 A | 5/1977 | Shaffer et al. | |
| 4,105,086 A | 8/1978 | Ishii et al. | |
| 4,175,638 A | 11/1979 | Christensen | |
| 4,263,979 A | 4/1981 | Sturgill | |
| 4,284,159 A | 8/1981 | Voelz | |
| 4,315,555 A | 2/1982 | Schritt | |
| 4,335,800 A | 6/1982 | Arato | |
| 4,367,803 A | 1/1983 | Wittren | |
| 4,373,603 A | 2/1983 | Nelson | |
| 4,412,594 A | 11/1983 | Furukawa et al. | |
| 4,418,780 A | 12/1983 | Ito et al. | |
| 4,446,941 A | 5/1984 | Laurich-Trost | |
| 4,529,052 A * | 7/1985 | Imai et al. ................ | 180/6.48 |
| 4,586,722 A | 5/1986 | Watanabe et al. | |
| 4,600,074 A | 7/1986 | Watanabe et al. | |
| 4,655,311 A | 4/1987 | Matsuda et al. | |

(Continued)

FOREIGN PATENT DOCUMENTS

EP          0 300 774          1/1989

*Primary Examiner*—Tony Winner
(74) *Attorney, Agent, or Firm*—Baker & Daniels LLP

(57) ABSTRACT

Methods and apparatus for steering a vehicle are disclosed. A vehicle in accordance with an exemplary embodiment of the present invention is capable of operating in a first steering mode and a second steering mode. The vehicle may comprise an input device capable of providing an input signal indicating that operation in the second steering mode is desired. The vehicle may comprise an electronic control unit (ECU) capable of providing an enabling signal when the ECU determines that operation in the second steering mode is appropriate for the present riding conditions.

21 Claims, 23 Drawing Sheets

U.S. PATENT DOCUMENTS

| | | |
|---|---|---|
| 4,671,523 A | 6/1987 | Naumann |
| 4,679,809 A | 7/1987 | Ito et al. |
| 4,687,214 A | 8/1987 | Uno |
| 4,687,216 A | 8/1987 | Kawamoto et al. |
| 4,700,960 A | 10/1987 | Miki et al. |
| 4,705,135 A | 11/1987 | Kawamoto et al. |
| 4,706,771 A | 11/1987 | Kawabe et al. |
| 4,715,466 A | 12/1987 | Ishii et al. |
| 4,721,318 A * | 1/1988 | Hase et al. .................. 180/409 |
| 4,730,839 A | 3/1988 | Miyoshi |
| 4,733,742 A | 3/1988 | Frye |
| 4,750,628 A | 6/1988 | Laurich-Trost |
| 4,770,264 A | 9/1988 | Wright et al. |
| 4,770,265 A | 9/1988 | Allen |
| 4,798,393 A | 1/1989 | Miura et al. |
| 4,823,899 A | 4/1989 | Ron |
| 4,828,061 A | 5/1989 | Kimbrough et al. |
| 4,840,243 A | 6/1989 | Hirabayashi et al. |
| 4,842,089 A | 6/1989 | Kimbrough et al. |
| 4,874,054 A | 10/1989 | Watanabe |
| 4,884,647 A | 12/1989 | Mimuro et al. |
| 4,893,689 A | 1/1990 | Laurich-Trost |
| 4,926,955 A | 5/1990 | Ohmura et al. |
| 4,933,855 A * | 6/1990 | Leiber et al. .................. 701/82 |
| 4,941,095 A | 7/1990 | Imaseki et al. |
| 4,967,859 A | 11/1990 | Tomlinson |
| 4,967,865 A | 11/1990 | Schindler |
| 4,999,003 A | 3/1991 | Koishi et al. |
| 5,035,295 A | 7/1991 | Leiber et al. |
| 5,036,933 A | 8/1991 | Heinrich |
| 5,036,939 A * | 8/1991 | Johnson et al. ............. 180/233 |
| 5,048,853 A | 9/1991 | Trefz et al. |
| 5,054,568 A | 10/1991 | Shiraishi et al. |
| 5,076,382 A | 12/1991 | Vaughn et al. |
| 5,086,863 A | 2/1992 | Tischer |
| 5,088,573 A | 2/1992 | Moll |
| 5,137,292 A | 8/1992 | Eisen |
| 5,144,857 A | 9/1992 | Kemper |
| 5,186,273 A | 2/1993 | Mori |
| 5,194,851 A | 3/1993 | Kraning et al. |
| 5,208,751 A | 5/1993 | Berkefeld |
| 5,212,642 A | 5/1993 | Tanaka et al. |
| 5,213,143 A | 5/1993 | Policky et al. |
| 5,219,212 A * | 6/1993 | Shimada et al. ............. 303/148 |
| 5,230,399 A | 7/1993 | Plate |
| 5,238,077 A | 8/1993 | Vaughn et al. |
| 5,249,639 A | 10/1993 | Marr et al. |
| 5,301,130 A * | 4/1994 | Alcone et al. ............... 702/141 |
| 5,322,308 A | 6/1994 | Bishop |
| 5,325,935 A | 7/1994 | Hirooka et al. |
| 5,337,850 A | 8/1994 | Mouri et al. |
| 5,348,111 A | 9/1994 | Williams et al. |
| 5,365,439 A | 11/1994 | Momose et al. |
| 5,379,220 A * | 1/1995 | Allen et al. .................... 701/41 |
| 5,386,365 A | 1/1995 | Nagaoka |
| 5,402,344 A | 3/1995 | Reister et al. |
| 5,417,299 A | 5/1995 | Pillar et al. |
| 5,482,125 A * | 1/1996 | Pagett ....................... 180/6.32 |
| 5,482,130 A | 1/1996 | Shimizu |
| 5,482,133 A | 1/1996 | Iwata et al. |
| 5,485,893 A | 1/1996 | Summers |
| 5,488,555 A | 1/1996 | Asgari et al. |
| 5,508,921 A | 4/1996 | Chikuma et al. |
| 5,526,263 A * | 6/1996 | Tanaka et al. .................. 701/70 |
| 5,533,584 A | 7/1996 | Johnson |
| 5,548,536 A | 8/1996 | Ammon |
| 5,559,698 A * | 9/1996 | Hwang ......................... 701/36 |
| 5,570,754 A | 11/1996 | Stimson |
| 5,576,959 A | 11/1996 | Hrovat et al. |
| 5,607,028 A | 3/1997 | Braun et al. |
| 5,642,281 A | 6/1997 | Ishida et al. |
| 5,694,319 A | 12/1997 | Suissa et al. |
| 5,696,677 A * | 12/1997 | Leaphart et al. ............... 701/37 |
| 5,718,304 A | 2/1998 | Lee |
| 5,732,371 A | 3/1998 | Fujita |
| 5,734,570 A | 3/1998 | Arlandis |
| 5,742,507 A | 4/1998 | Eckert |
| 5,755,382 A | 5/1998 | Skotinkov |
| 5,758,740 A | 6/1998 | Park |
| 5,790,966 A | 8/1998 | Madau et al. |
| 5,790,970 A | 8/1998 | Brachert et al. |
| 5,799,259 A | 8/1998 | Rief et al. |
| 5,805,449 A * | 9/1998 | Ito .................................. 701/41 |
| 5,809,444 A | 9/1998 | Hadeler et al. |
| 5,816,669 A | 10/1998 | Hiwatashi et al. |
| 5,832,402 A | 11/1998 | Brachert et al. |
| 5,954,349 A | 9/1999 | Rutzel |
| 5,964,814 A | 10/1999 | Muller et al. |
| 5,996,722 A * | 12/1999 | Price ......................... 180/403 |
| 6,012,351 A * | 1/2000 | Ysker ..................... 74/473.15 |
| 6,073,067 A | 6/2000 | Fujiwara et al. |
| 6,085,860 A | 7/2000 | Hackl et al. |
| 6,119,882 A | 9/2000 | Crook et al. |
| 6,164,406 A | 12/2000 | Diekhans et al. |
| 6,186,267 B1 | 2/2001 | Hackl et al. |
| 6,192,304 B1 | 2/2001 | Goetz |
| 6,203,121 B1 * | 3/2001 | Kato et al. .................. 303/150 |
| 6,206,127 B1 | 3/2001 | Zakula, Sr. et al. |
| 6,226,579 B1 | 5/2001 | Hackl et al. |
| 6,226,581 B1 * | 5/2001 | Reimann et al. ............... 701/48 |
| 6,308,134 B1 * | 10/2001 | Croyle et al. ............... 701/220 |
| 6,345,682 B1 | 2/2002 | Schoffler et al. |
| 6,371,243 B1 | 4/2002 | Donaldson et al. |
| 6,374,171 B2 * | 4/2002 | Weiberle et al. ............... 701/71 |
| 6,374,940 B1 | 4/2002 | Pickert |
| 6,408,230 B2 * | 6/2002 | Wada ............................. 701/1 |
| 6,424,054 B1 | 7/2002 | Onnen et al. |
| 6,454,294 B1 | 9/2002 | Bittner et al. |
| 6,481,524 B1 | 11/2002 | Ishida et al. |
| 6,488,504 B1 | 12/2002 | Patterson |
| 6,502,837 B1 * | 1/2003 | Hamilton et al. ........ 280/5.515 |
| 6,523,634 B1 * | 2/2003 | Gagnon et al. ............. 180/291 |
| 6,554,084 B1 * | 4/2003 | Enmeiji ...................... 180/6.24 |
| 6,556,908 B1 * | 4/2003 | Lu et al. ........................ 701/38 |
| 6,557,658 B1 | 5/2003 | Enmeiji et al. |
| 6,564,131 B2 * | 5/2003 | Sebastian et al. ............. 701/41 |
| 6,564,663 B2 * | 5/2003 | Rioux et al. ................ 74/336 R |
| 6,581,714 B1 * | 6/2003 | Kamen et al. .............. 180/333 |
| 6,600,985 B2 * | 7/2003 | Weaver et al. ................. 701/45 |
| 6,615,944 B1 * | 9/2003 | Horwath et al. ............ 180/204 |
| 6,625,529 B2 * | 9/2003 | Obata et al. ................ 180/6.24 |
| 6,703,717 B2 * | 3/2004 | Kawamoto et al. ........ 290/38 R |
| 6,738,714 B2 * | 5/2004 | McCall et al. .............. 701/220 |
| 6,816,764 B2 * | 11/2004 | Coelingh et al. ............. 701/37 |
| 6,862,506 B2 * | 3/2005 | Boswell et al. ............... 701/41 |
| 6,865,468 B2 * | 3/2005 | Lin et al. ...................... 701/70 |
| 6,871,125 B2 * | 3/2005 | Oshima et al. ................ 701/41 |

* cited by examiner

ALL TERRAIN VEHICLE WITH MULTIPLE STEERING MODES

RELATED APPLICATIONS

The present Application claims the benefit of U.S. Provisional Patent Application No. 60/442,697, filed Jan. 27, 2003.

The present Application claims the benefit of U.S. Provisional Patent Application No. 60/459,665, filed Apr. 2, 2003.

The present Application claims the benefit of a U.S. Provisional Patent Application No. 60/483,685 entitled ATV with Multiple Steering Modes and filed Jun. 30, 2003.

The present application is also related to a U.S. patent application entitled "Controller for Steering a Vehicle" by the same inventors and filed on an even date herewith.

The entire disclosure all above-mentioned patent applications is hereby incorporated by reference herein.

FIELD OF THE INVENTION

The present invention relates generally to land vehicles. More particularly, the present invention relates to methods and apparatus for steering a land vehicle.

BACKGROUND OF THE INVENTION

In recent years, recreational vehicles have gained widespread popularity. Perhaps the most common recreational vehicle application is trail riding. Trail riding on a recreational vehicle allows the rider to travel through areas that are not accessible by ordinary automobiles. Modern recreational vehicles, can cover ground very rapidly and can cover great distances. Frequently, recreational vehicle enthusiasts ride their recreational vehicle for many hours straight and cover many miles. During such long rides, a recreational vehicle may be used to carry a rider through a wide variety of terrain. Terrain that may be encountered includes snow, sand, mud and swampland.

Part of the thrill of riding a recreational vehicle is encountering challenging terrain and, through the performance of the recreational vehicle and the skill of the rider, passing through the terrain. It is not uncommon for recreational vehicle riders to seek out large mud holes and attempt to traverse these obstacles with a recreational vehicle. The depth of some of these mud holes is actually greater than the height of the recreational vehicle. When passing through an obstacle such as mud hole, the recreational vehicle may become immersed in water, mud, or a mixture thereof.

SUMMARY OF THE INVENTION

The present invention relates generally to recreational vehicles. More particularly, the present invention relates to all terrain vehicles having a straddle-seat for accommodating a rider and a handlebar for receiving the hands of the rider. Methods and apparatus in accordance with the present invention permit the vehicle rider to select a steering mode that is determined appropriate for the present riding conditions. In some embodiments, three steering modes are provided: a tight turning radius steering mode, a front wheel only steering mode, and a crab steering mode.

In certain advantageous embodiments of the present invention, one or more actuators are provided for selectively steering one or more rear wheels of the vehicle. In these advantageous embodiments, an electronic control unit (ECU) may be coupled to the one or more actuators. The ECU may calculate a desired steering angle for each rear wheel. The ECU may also provide a control signal to the one or more actuators so that the one or more rear wheels are rotated about their respective steering axes by the steering angle (s).

When the vehicle is operating in the tight turning radius steering mode, the rear wheels and the front wheels rotate about their corresponding steering axes in an opposite phase relationship (i.e., each rear wheel rotates about its steering axis in a clockwise direction when each front wheel is rotating about its steering axis in a counter clockwise direction). This arrangement allows the vehicle to perform turns having a relatively small radius. This arrangement may allow the vehicle, for example, to pass between tightly spaced obstacles.

When the vehicle is operating in the crab steering mode, each rear wheel rotates about a steering axis in a same-phase relationship with a front wheel (i.e., each rear wheel rotates about its steering axis in a clockwise direction when each front wheel is rotating about its steering axis in a clockwise direction). In some riding conditions, operation in the crab mode may allow the vehicle to move somewhat laterally in search of better traction. By turning the handlebar to the right and/or to the left, the operator rider may seek to move the vehicle somewhat laterally (left or right) in search of better traction to aid in traversing the terrain. In some advantageous implementations, the rear wheels can be positioned so that they do not track the front wheels while the vehicle is in the crab mode. When this is the case, traction may be enhanced when the rear wheels encounter terrain that the front wheels have not yet passed over.

When the vehicle rider determines that a particular steering mode is appropriate for the present riding conditions, an input device may be used to produce an input signal. A vehicle in accordance with the present invention, may also comprise an electronic control unit (ECU) coupled to a plurality of sensors. The ECU may compare a first riding parameter to a second riding parameter in order to determine whether operation in a second steering mode is appropriate, in light of present riding conditions. The ECU may produce an enabling signal when the ECU determines that operation in the second steering mode is appropriate for the present riding conditions.

In some exemplary embodiments of the present invention, the first signal represents the velocity of the vehicle and the second signal is representative of a velocity of a ground contacting portion of an instrument wheel of the vehicle. Also in some exemplary embodiments of the present invention, the first signal is representative of a linear acceleration of the vehicle, and the second signal is representative of a linear acceleration of a ground contacting portion of a wheel of the vehicle. When a detected inconsistency between the first signal and the second signal is greater than a certain threshold, the ECU, including a comparator, will not provide an enabling signal.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
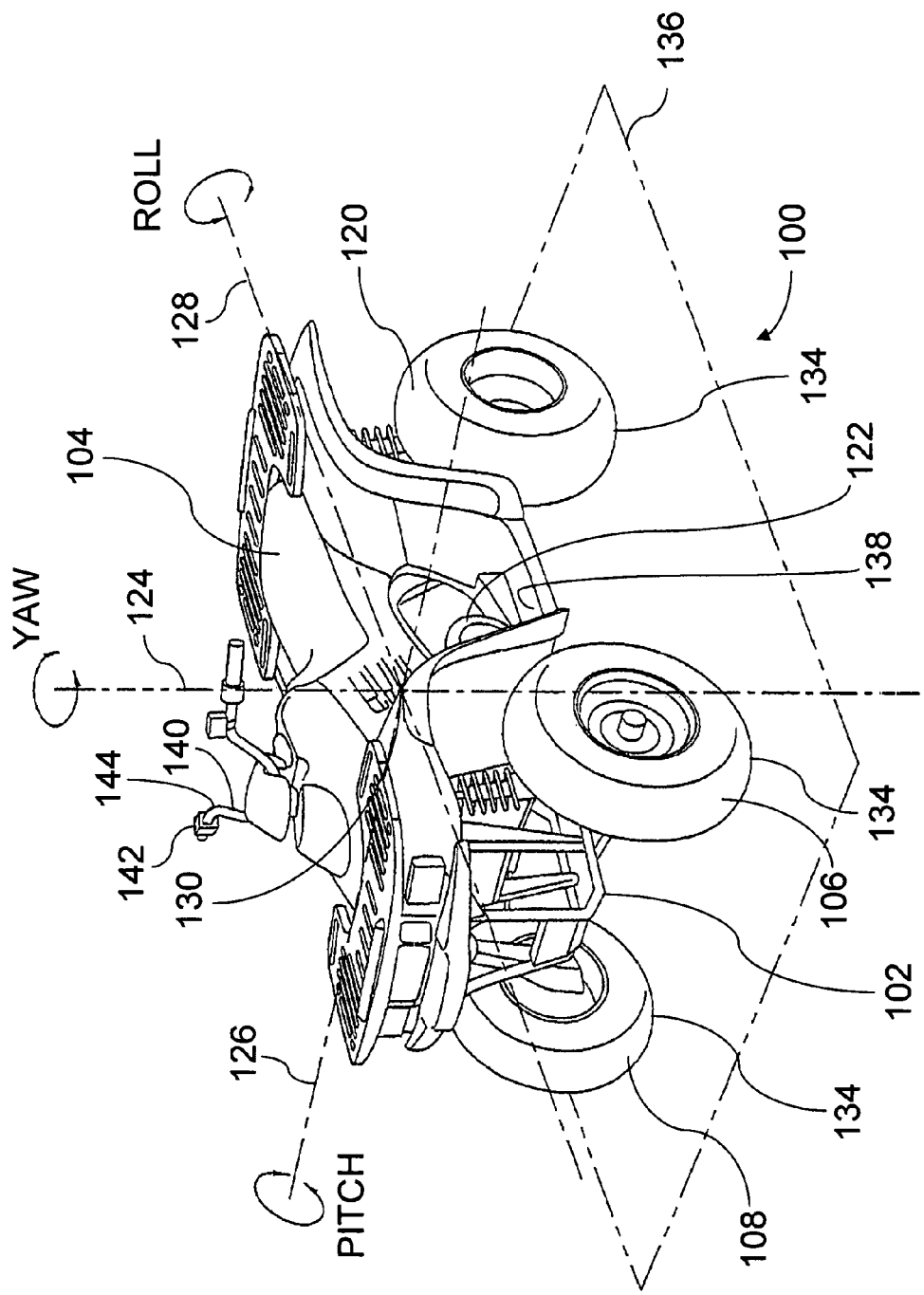
FIG. 1 is a perspective view of a vehicle in accordance with an exemplary embodiment of the present invention.

FIG. 1 is a perspective view of a vehicle 100 in accordance with an exemplary embodiment of the present invention. Vehicle 100 of FIG. 1 may be generally referred to as an ATV. Vehicle 100 comprises a chassis 102 carrying a straddle type seat 104. In the embodiment of FIG. 1, straddle type seat 104 is sufficiently narrow to be straddled by a vehicle rider. In the embodiment of FIG. 1, vehicle 100 has a left front wheel 106, a right front wheel 108, a left rear wheel 120 and right rear wheel (not visible in FIG. 1). Vehicle 100 also includes an engine 122 that is carried by chassis 102. Engine 122 is preferably coupled to at least some wheels of vehicle 100 via a drive train for propelling vehicle 100. Engine 122 may be used to power each rear wheel, and in some cases also each front wheel.

In FIG. 1, a yaw axis 124, a pitch axis 126, and a roll axis 128 are all shown intersecting a centroid 130 of vehicle 100. As shown in FIG. 1, each left front wheel 106 and right wheel 132 each have a momentary contact point 134. Likewise, left rear wheel 120 has a momentary contact point 134. The momentary contact points of the wheels define a wheel contact plane 136. In the embodiment of FIG. 1, left front wheel 106 and right front wheel 108 are each coupled to chassis 102 by a front suspension and left rear wheel 120 is coupled to chassis 102 by a rear suspension.

Vehicle 100 also includes a first footrest 138 that can be seen extending from one side of chassis 102 in FIG. 1. Vehicle 100 may also include a second footrest (not shown in FIG. 1) that extends from the other side of the chassis. Vehicle 100 also includes a steering member 140 that may be used for steering vehicle 100. In the embodiment of FIG. 1, steering member 140 comprises a handlebar. Vehicle 100 of FIG. 1 may advantageously operate in more than one steering mode. An input device 142 of vehicle 100 may be used to provide a signal indicative of a desired steering mode. In the embodiment of FIG. 1, input device 142 comprises a switch disposed on an arm 144 of the handlebar.

Figure 2:
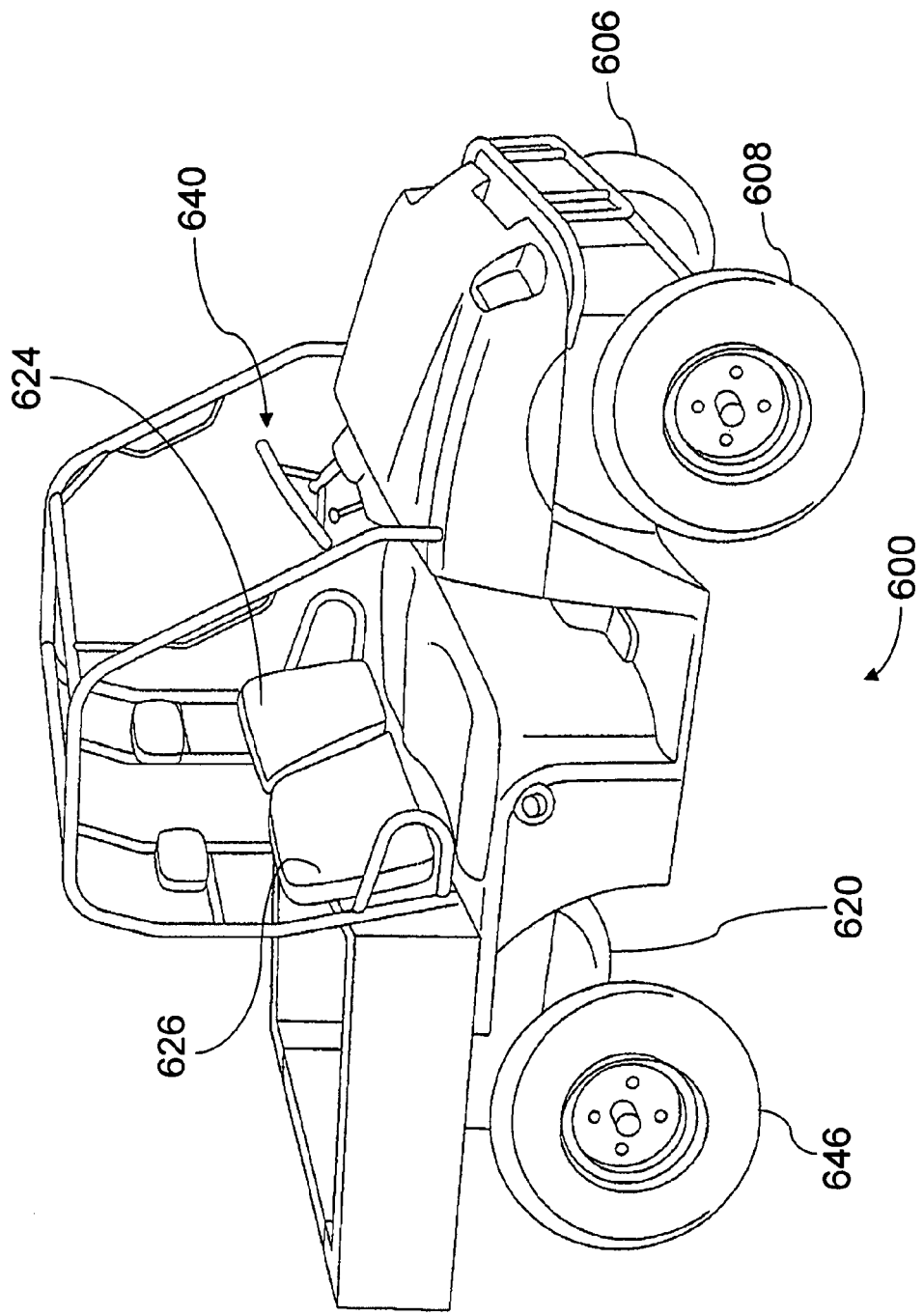
FIG. 2 is a perspective view of a vehicle in accordance with an additional exemplary embodiment of the present invention.

FIG. 2 is an isometric view of a vehicle 600 in accordance with an additional exemplary embodiment of the present invention. Vehicle 600 of FIG. 2 comprises a first seat 624 and a second seat 626. In the embodiment of FIG. 2, first seat 624 and second seat 626 are positioned and dimensioned so as to accommodate two persons sitting side-by-side. Vehicle 600 also includes a steering member 640 that may be used for steering vehicle 600. In the embodiment of FIG. 2, steering member 640 comprises a steering wheel. Vehicle 600 of FIG. 2 includes a left front wheel 606, right front wheel 608, left rear wheel 620, and a right rear wheel 646. In some exemplary embodiments of the present invention, the wheels of vehicle 600 may turned in accordance more than one steering mode. An input device of vehicle 600 may be used to provide a signal indicating a steering mode desired by the vehicle operator.

Figure 3:
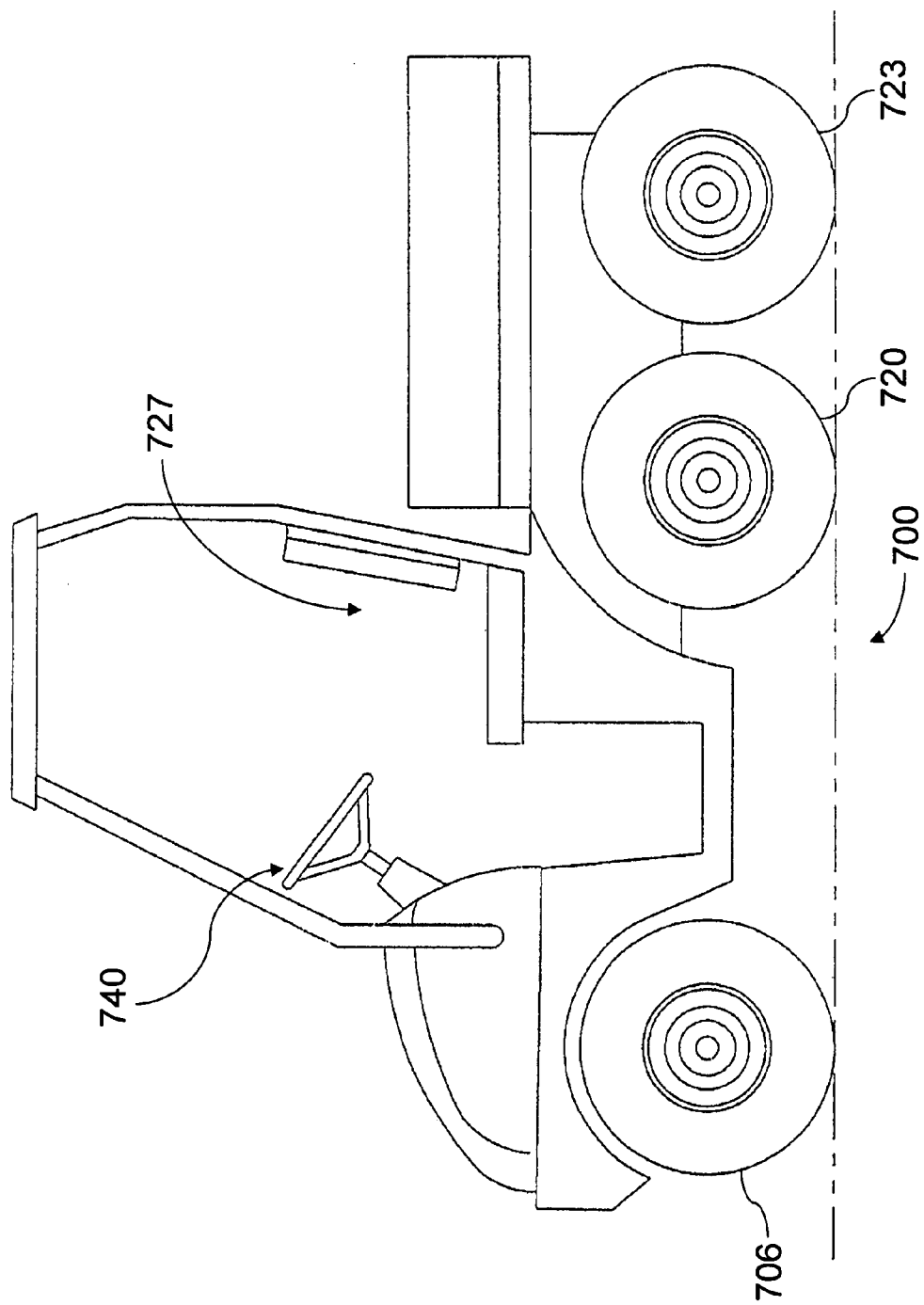
FIG. 3 is a side view of a vehicle in accordance with another exemplary embodiment of the present invention.

FIG. 3 is a side view of a vehicle 700 in accordance with another exemplary embodiment of the present invention. Vehicle 700 of FIG. 3 comprises a seat 727 that is positioned and dimensioned to accommodate a sitting person. Vehicle 700 also includes a steering member 740 that may be used for steering vehicle 700. In the embodiment of FIG. 3, steering member 740 comprises a steering wheel. A left front wheel 706, a first left rear wheel 720 and a second left rear wheel 723 are shown in FIG. 3. In the exemplary embodiment of FIG. 3, vehicle 700 includes one additional front wheel and two additional rear wheels that are not visible in FIG. 3. In some exemplary embodiments of the present invention, these wheels may all be turned in accordance one or more steering modes.

Figure 4:
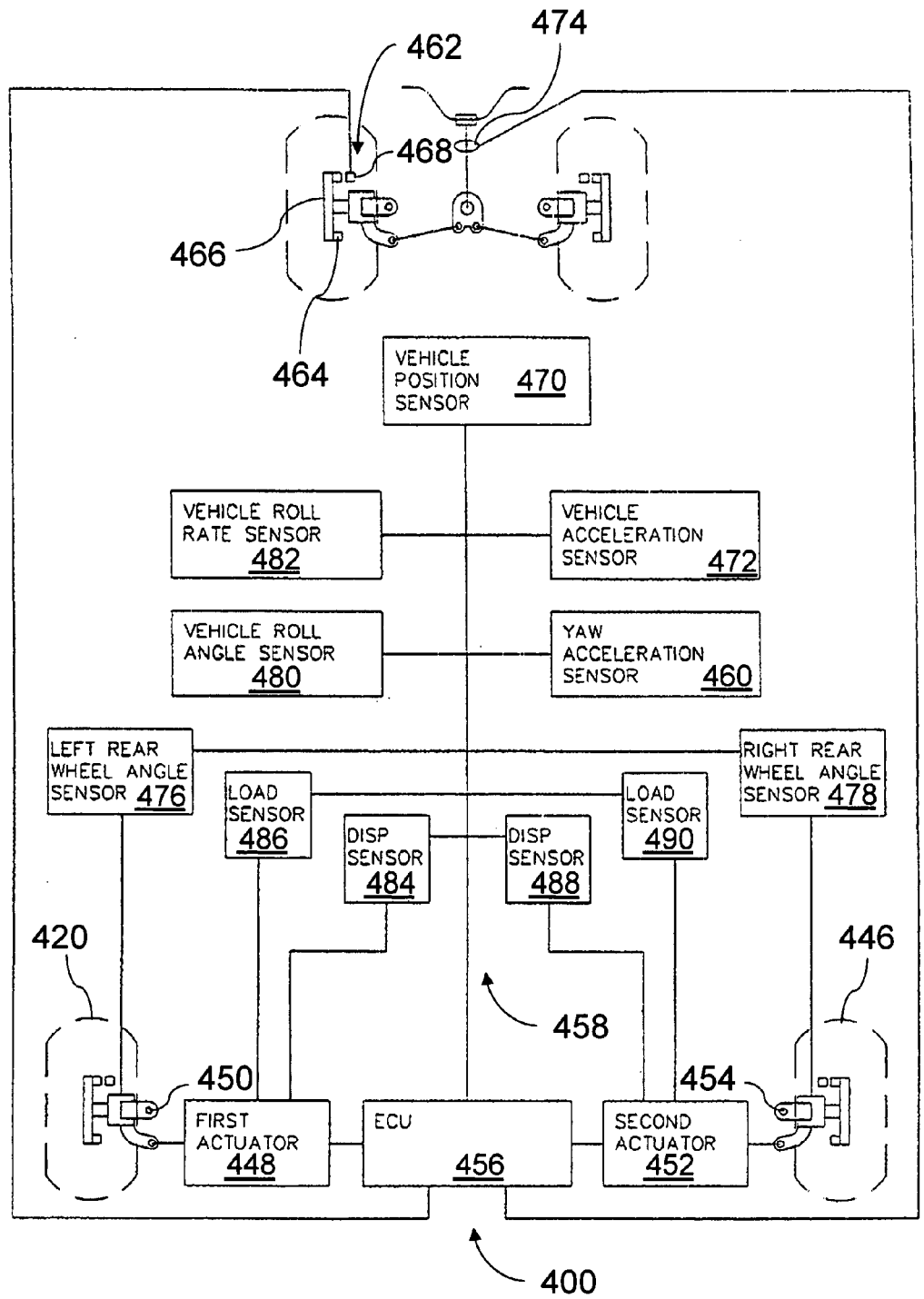
FIG. 4 is a block diagram showing a vehicle in accordance with the present invention.

FIG. 4 is a block diagram showing a vehicle 400 in accordance with the present invention. Vehicle 400 includes a left rear wheel 420 and a right rear wheel 446. In the embodiment of FIG. 4, a first actuator 448 and a second actuator 452 are coupled to left rear wheel 420 and right rear wheel 446 respectively. In the embodiment of FIG. 4, first actuator 448 is capable of selectively rotating left rear wheel 420 about a first steering axis 450. Similarly, second actuator 452 is capable of selectively rotating right rear wheel 446 about a second steering axis 454.

In the embodiment of FIG. 4, first actuator 448 and second actuator 452 are both connected to an electronic control unit (ECU) 456. With reference to FIG. 4, it may also be appreciated that a sensor array 458 is coupled to ECU 456. In some advantageous embodiments of the present invention, ECU 456 is capable of calculating a left rear wheel steering angle and a right rear wheel steering angle. In some cases, the value of the left rear wheel steering angle and a right rear wheel steering angle may be based upon signals received from sensor array 458. ECU 456 may also provide a control signal to first actuator 448, causing first actuator 448 to turn left rear wheel 420 about first steering axis 450 by the left rear wheel steering angle. Additionally, ECU 456 may provide a control signal to second actuator 452, causing second actuator 452 to turn right rear wheel 446 about second steering axis 454 by a right rear wheel steering angle.

It is to be appreciated that sensor array 458 may comprise various sensors without deviating from the spirit and scope of the present invention. For example, a sensor array in accordance with the present invention may include, but is not limited to a handlebar angle sensor, a left rear wheel angle sensor, a right rear wheel angle sensor, a vehicle roll angle sensor, a vehicle roll rate sensor, an actuator displacement sensor, an actuator load sensor, a yaw acceleration sensor, a vehicle acceleration sensor, and a vehicle position sensor.

In the embodiment of FIG. 4, sensor array 458 comprises a yaw acceleration sensor 460. Yaw acceleration sensor 460 may comprise, for example, two accelerometers that are arranged to measure acceleration of vehicle 400 in a lateral direction. These two accelerometers may be longitudinally spaced so that rotational acceleration about an axis disposed between the two accelerometers may be calculated using the output from the two accelerometers.

Sensor array 458 of FIG. 4 also comprises a wheel rotation sensor 462. Wheel rotation sensor 462 may comprise various components without deviating from the spirit and scope of the present invention. For example, wheel rotation sensor 462 may comprise a ring 464 coupled to an instrumented wheel 466 and a ring detector 468 coupled to the chassis of vehicle 400. Ring 464 may comprise, for example, a toothed ring comprising a ferrous material and/or a magnetic ring having alternating magnetic poles. Ring detector 468 may comprise, for example, one or more Hall effect sensors and/or one or more magnostrictive sensors.

A vehicle position sensor 470 of sensor array 458 is also shown in FIG. 4. Vehicle position sensor 470 may comprise various components without deviating from the spirit and scope of the present invention. For example, vehicle position sensor 470 may comprise a global positioning system (GPS). GPS chip sets are commercially available from Motorola of Phoenix, Ariz.; Phillips Semiconductor of Sunnyvale, Calif.; Rockwell Semiconductor of Newport Beach, Calif.; SGS-Thompson of Lincoln, Mass.; SiRF Technology of Sunnyvale Calif.; and GEC Plessey of Scotts Valley Calif.

By way of a second example, vehicle position sensor 470 may comprise an emitter for emitting a beam and a detector for detecting a reflected portion of the beam. In some embodiments the beam may comprise electromagnetic radiation (e.g., infrared light, visible light, ultraviolet light, and laser light). In other embodiments, the beam may comprise sound waves and/or ultrasonic waves. By way of yet another example, vehicle position sensor may comprise a radio location system (e.g., LORAN). Vehicle acceleration sensor 472 may comprise an accelerometer.

In the embodiment of FIG. 4, sensor array 458 also comprises a handlebar angle sensor 474, a left rear wheel angle sensor 476, a right rear wheel angle sensor 478, a vehicle roll angle sensor 480, a vehicle roll rate sensor 482, a first actuator displacement sensor 484, a first actuator load sensor 486, a second actuator displacement sensor 488, and a second actuator load sensor 490

Figure 5:
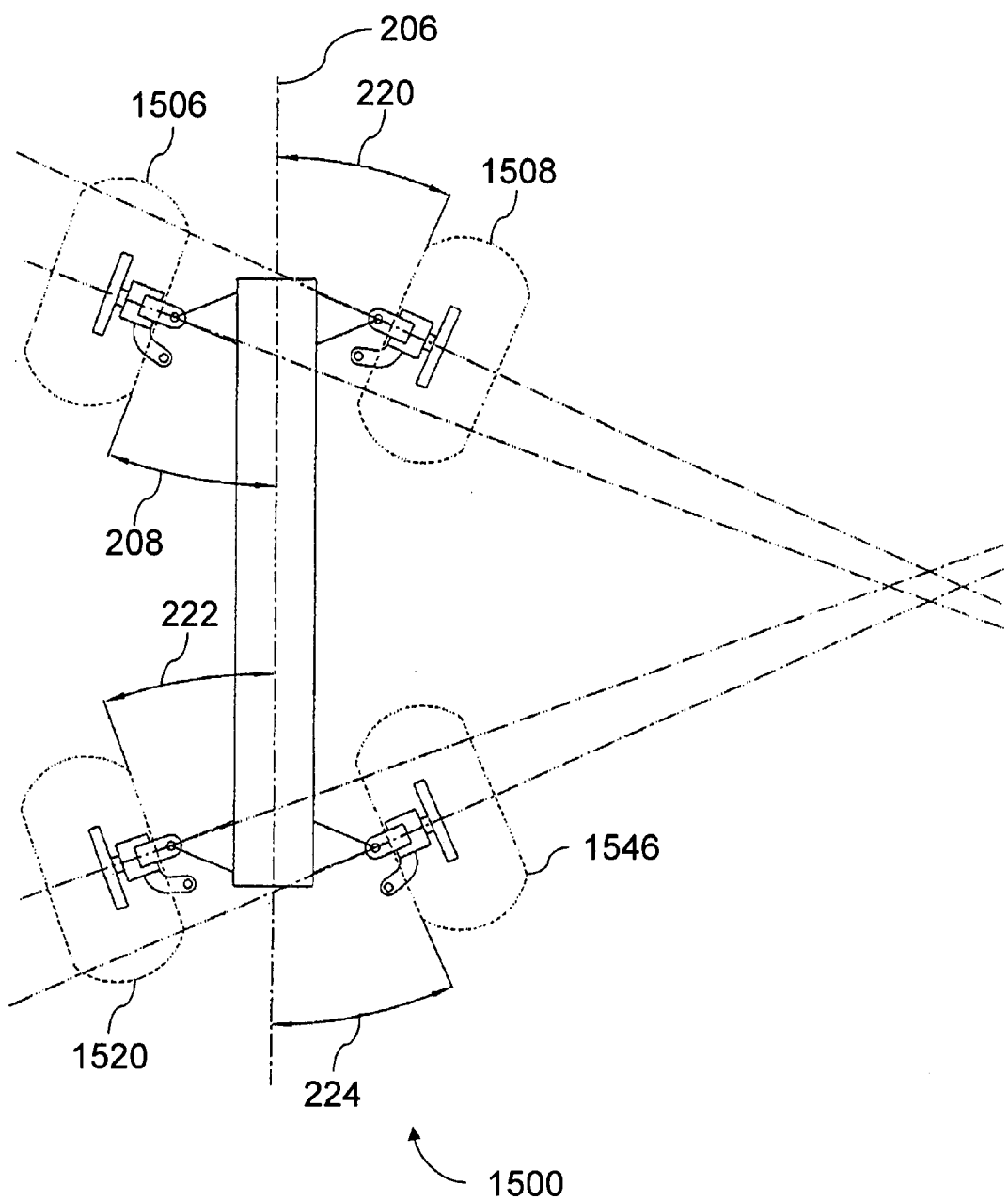
FIG. 5 is a top view of a vehicle operating in a tight turning radius steering mode.

FIG. 5 is a top view of a vehicle 1500 having a left front wheel 1506, a right front wheel 1508, a left rear wheel 1520 and a right rear wheel 1546. In the embodiment of FIG. 5, vehicle 1500 is operating in a tight turning radius steering mode. When vehicle 1500 is operating in the tight turning radius steering mode, the front wheels and the rear wheels rotate about their corresponding steering axes in an opposite phase relationship (i.e., each rear wheel is rotating about its steering axis in a clockwise direction when each front wheel is rotating about its steering axis in a counter clockwise direction).

With reference to FIG. 5, it may be appreciated that each wheel is turned relative to a longitudinal axis 206 of vehicle 1500 by a steering angle. More particularly, left front wheel 1506 is turned by a first steering angle 208, right front wheel 1508 is turned by a second steering angle 220, left rear wheel 1520 is turned by a third steering angle 222 and right rear wheel 1546 is turned by a fourth steering angle 224. The turning arrangement illustrated in FIG. 5 may allow vehicle 1500 to perform turns having a relatively small radius. This arrangement may allow vehicle 1500, for example, to pass between tightly spaced obstacles.

Figure 6:
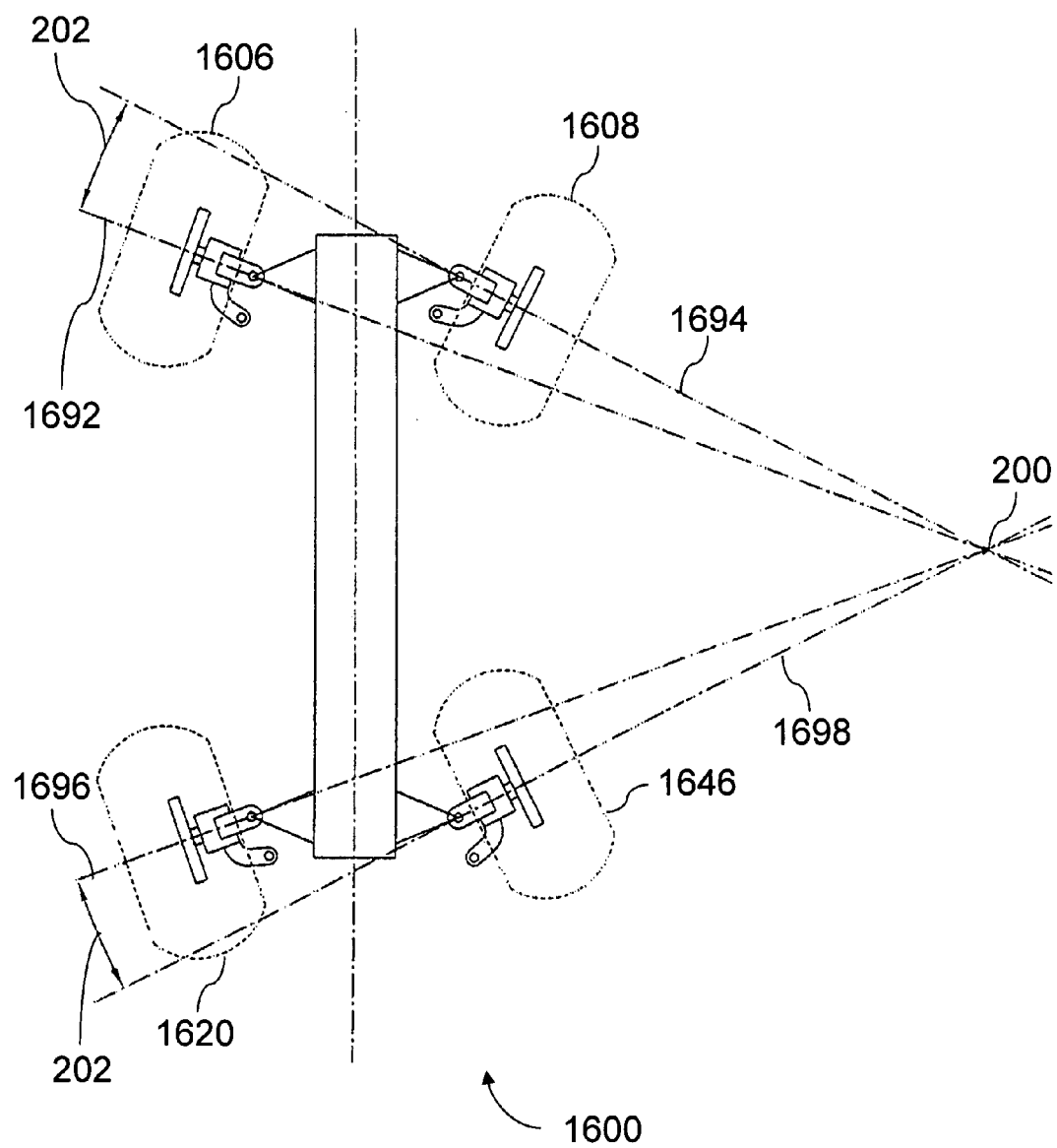
FIG. 6 is a top view of a vehicle operating in a tight turning radius steering mode.

FIG. 6 is a top view of a vehicle 1600 having a left front wheel 1606, a right front wheel 1608, a left rear wheel 1620 and a right rear wheel 1646. In the embodiment of FIG. 6, vehicle 1600 is operating in a tight turning radius steering mode. When vehicle 1600 is operating in the tight turning radius steering mode, the front wheels and the rear wheels rotate about their corresponding steering axes in an opposite phase relationship (i.e., each rear wheel is rotating about its steering axis in a clockwise direction when each front wheel is rotating about its steering axis in a counter clockwise direction).

In FIG. 6 a rotational axis of each wheel is illustrated using a dashed line. More particularly, left front wheel 1606 rotates about a first rotational axis 1692, right front wheel 1608 rotates about a second rotational axis 1694, left rear wheel 1620 rotates about a third rotational axis 1696 and right rear wheel 1646 rotates about a fourth rotational axis 1698. In FIG. 6, first rotational axis 1692, second rotational axis 1694, third rotational axis 1696 and fourth rotational axis 1698 are all shown intersecting at a turn center 200. In the embodiment of FIG. 6, first rotational axis 1692 and second rotational axis 1694 define a front Ackerman angle 202. Similarly, third rotational axis 1696 and fourth rotational axis 1698 are shown defining a rear Ackerman angle 204 in FIG. 6.

Figure 7:
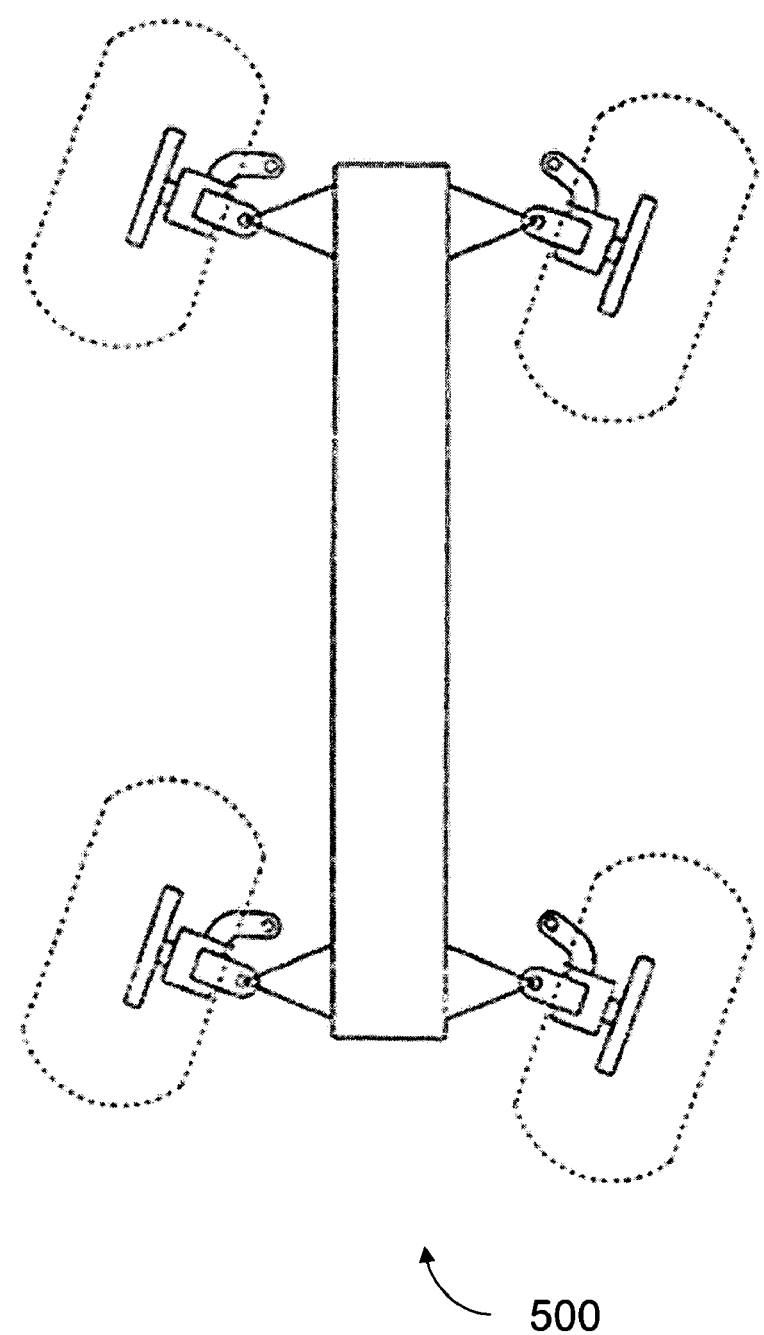
FIG. 7 is a top view of a vehicle operating in a crab steering mode.

FIG. 7 is a top view of a vehicle 500 that is operating in a crab steering mode. When the vehicle is operating in the crab steering mode, each rear wheel rotates about a steering axis in a same-phase relationship with a front wheel (i.e., each rear wheel is rotating about its steering axis in a clockwise direction when each front wheel is rotating about its steering axis in a clockwise direction. By rotating the handlebar clockwise and/or counter clockwise, the vehicle rider may seek to move the vehicle somewhat laterally (left or right) in search of better traction to aid in traversing the terrain. In some advantageous implementations, the rear wheels are capable of assuming a position so as to not track the front wheels. When this is the case, traction may be enhanced as the rear wheels encounter terrain that the front wheels have not yet passed over.

Figure 8:
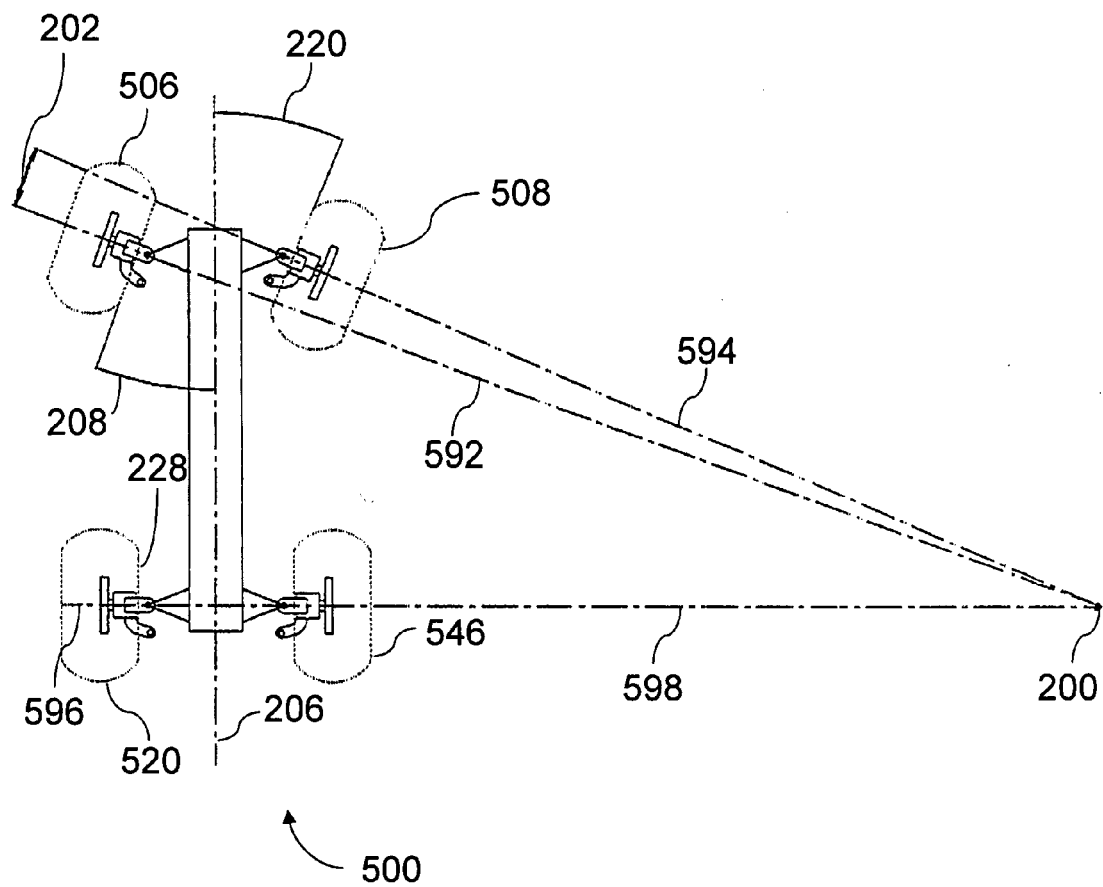
FIG. 8 is a top view of a vehicle operating in a front-only steering mode.

FIG. 8 is a top view of vehicle 500 operating in a front-only steering mode. With reference to FIG. 8, it may be appreciated that when vehicle 500 is operating in the front only steering mode, the steering angle of left rear wheel 520 and right rear wheel 546 remains substantially constant with the rear wheels locked in a straight forward running position. With reference to FIG. 8, it may be appreciated that a wheel plane 226 defined by an inside surface 228 of left rear wheel 520 is substantially parallel to a longitudinal axis 206 of vehicle 500.

In the embodiment of FIG. 8, each front wheel may be selectively rotated about a steering axis. With reference to FIG. 8, it may be appreciated that each front wheel is turned relative to longitudinal axis 206 of vehicle 500 by a steering angle. More particularly, left front wheel 506 is turned by a first steering angle 208 and right front wheel 508 is turned by a second steering angle 220.

In FIG. 8 a rotational axis of each wheel is illustrated using a dashed line. More particularly, left front wheel 506 rotates about a first rotational axis 592, right front wheel 508 rotates about a second rotational axis 594, left rear wheel 520 rotates about a third rotational axis 596 and right rear wheel 546 rotates about a fourth rotational axis 598. In FIG. 8, first rotational axis 592, second rotational axis 594, third rotational axis 596 and fourth rotational axis 598 are all shown intersecting at a turn center 200. In the embodiment of FIG. 8, first rotational axis 592 and second rotational axis 594 define a front Ackerman angle 202.

Figure 9:
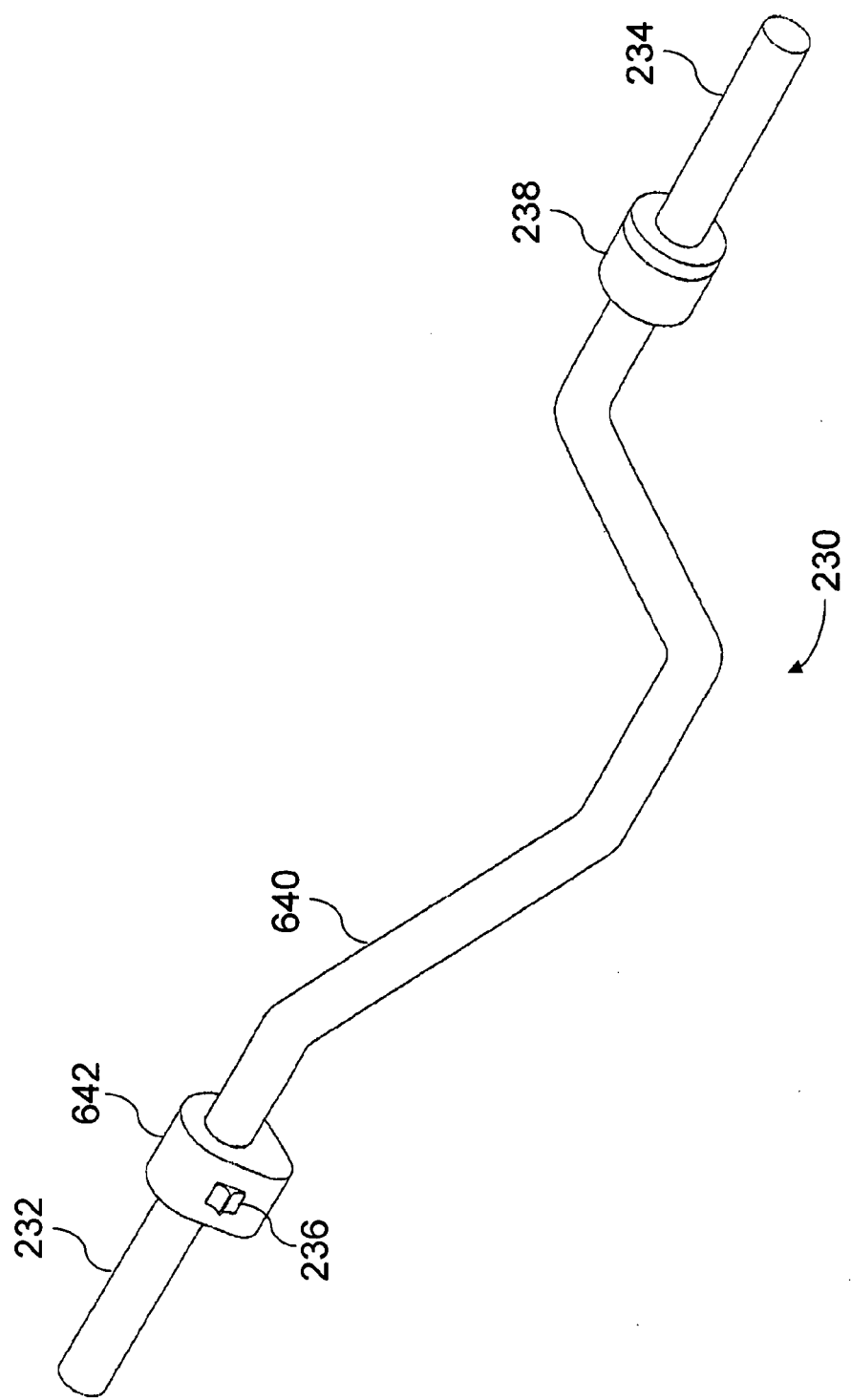
FIG. 9 is an isometric view of a handlebar assembly in accordance with an exemplary embodiment of the present invention.

FIG. 9 is an isometric view of a handlebar assembly 230 in accordance with an exemplary embodiment of the present invention. Handlebar assembly 230 includes a handlebar 640, a left grip 232 and a right grip 234. A user input device 642 is disposed proximate left grip 232. In the embodiment of FIG. 9, user input device 642 comprises a switch 236.

In certain advantageous embodiments of the present invention, input device 642 may be used to select a steering mode of a vehicle. In certain advantageous embodiments, switch 236 and left grip 232 are located and dimensioned so that the thumb a left hand can be used to actuate switch 236 while an index finger of the left hand remains in contact with left grip 232. Also in certain advantageous embodiments, switch 236 and left grip 232 are located and dimensioned so that a left hand of the rider can maintain a grip on left grip 232 while a thumb of the left hand is used to actuate switch 236. A throttle mechanism 238 is coupled to right grip 234. In a preferred embodiment of the present invention, throttle mechanism is configured so that rotation of right grip 234 acts to change the rotational speed of the crankshaft of an engine.

Figure 10:
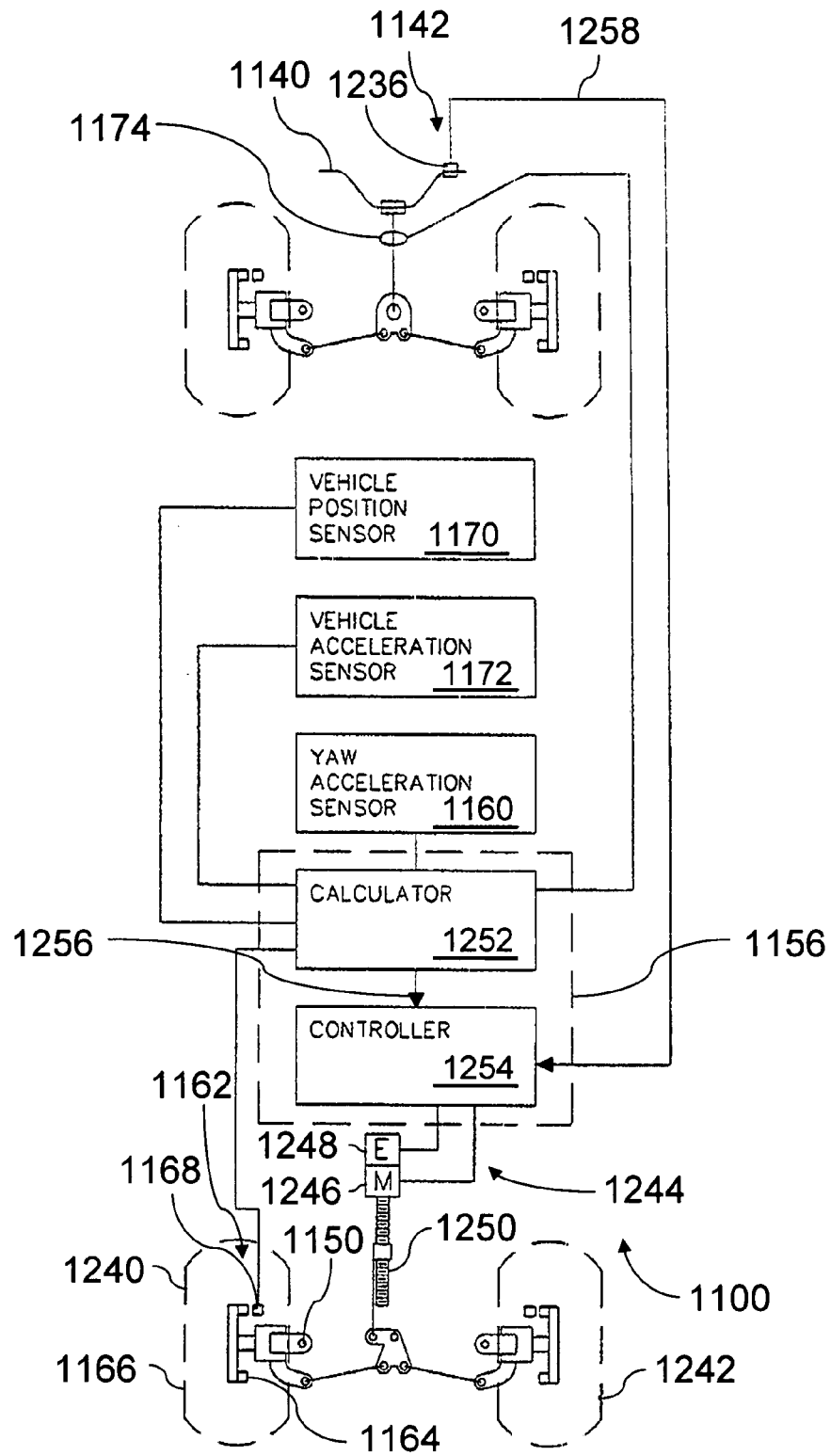
FIG. 10 is a block diagram showing a vehicle in accordance with the present invention.

FIG. 10 is a block diagram showing a vehicle 1100 in accordance with the present invention. Vehicle 1100 includes a first rear wheel 1240 and a second rear wheel 1242. In the embodiment of FIG. 10, a linear actuator 1244 is coupled to first rear wheel 1240 and second rear wheel 1242 such that linear actuator 1244 is capable of selectively rotating first rear wheel 1240 about a first steering axis 1150. In the embodiment of FIG. 10, linear actuator 1244 comprises a motor 1246, an encoder 1248, and a lead screw 1250.

With continuing reference to FIG. 10, it may be appreciated that motor 1246 and encoder 1248 are both connected to an electronic control unit (ECU) 1156. In the embodiment of FIG. 10, ECU 1156 comprises a calculator 1252, or comparator, and a controller 1254. In some advantageous embodiments, ECU 1156 is adapted to selectively provide a control signal to linear actuator 1244, causing linear actuator 1244 to turn first rear wheel 1240 and second rear wheel 1242 about their respective steering axes.

ECU 1156 is also connected to an input device 1142. In the embodiment of FIG. 10, input device 1142 comprises an electric switch 1236 mounted on a handlebar 1140 of vehicle 1100. Input device 1142 is preferably adapted for providing an input signal indicating that operation in a particular mode is desired. In the embodiment of FIG. 10, ECU 1156 includes a calculator 1252 that is capable of providing an enabling signal 1256 to controller 1254. In some embodiments of the present invention, controller 1254 will only provide a control signal to linear actuator 1244 if both an input signal 1258 and an enabling signal 1256 are present.

For example, in some embodiments, controller 1254 will only provide control signal 1260, if it is determined that vehicle 1100 is operating at a relatively slow ground speed. By way of second example, in some embodiments, controller 1254 will only provide control signal 1260, if the vehicle is stuck, for example when a high degree of slippage is present between the wheels of the vehicle and the ground.

The system of FIG. 10 also includes a yaw acceleration sensor 1160 that is connected to ECU 1156. Yaw acceleration sensor 1160 may comprise, for example, two accelerometers that are arranged to measure acceleration of vehicle 1100 in a lateral direction. These two accelerometers may be longitudinally spaced so that rotational acceleration about an axis disposed between the two accelerometers may be calculated using the output from the two accelerometers.

Vehicle 1100 of FIG. 10 also includes a handlebar 1140 that may be used for turning the front wheels of vehicle 1100. In the embodiment of FIG. 10, a handlebar angle sensor 1174 is coupled to handlebar 1140. With reference to FIG. 10, it will be appreciated that embodiments of the present invention are possible in which the turning of the front wheels of vehicle 1100 is independent of the turning of the rear wheels of vehicle 1100.

In FIG. 10 a wheel rotation sensor 1162 is shown connected to ECU 1156. Wheel rotation sensor 1162 may comprise various components without deviating from the spirit and scope of the present invention. For example, wheel rotation sensor 1162 may comprise a ring 1164 coupled to an instrumented wheel 1166 and a ring detector 1168 coupled to the chassis of vehicle 1100. Ring 1164 may comprise, for example, a toothed ring comprising a ferrous material and/or a magnetic ring having alternating magnetic poles. Ring detector 1168 may comprise, for example, one or more Hall effect sensors and/or one or more magnostrictive sensors.

In the embodiment of FIG. 10, a vehicle position sensor 1170 and a vehicle acceleration sensor 1172 are connected to ECU 1156. Vehicle position sensor 1170 may comprise various components without deviating from the spirit and scope of the present invention. For example, vehicle position sensor 1170 may comprise a global positioning system (GPS). GPS chip sets are commercially available from Motorola of Phoenix, Ariz.; Phillips Semiconductor of Sunnyvale, Calif.; Rockwell Semiconductor of Newport Beach, Calif.; SGS-Thompson of Lincoln, Mass.; SiRF Technology of Sunnyvale Calif.; and GEC Plessey of Scotts Valley Calif.

By way of a second example, vehicle position sensor 1170 may comprise an emitter for emitting a beam and a detector for detecting a reflected portion of the beam. In some embodiments the beam may comprise electromagnetic radiation (e.g., infrared light, visible light, ultraviolet light, and laser light). In other embodiments, the beam may comprise sound waves and/or ultrasonic waves. By way of yet another example, vehicle position sensor may comprise a radio location system (e.g., LORAN). Vehicle acceleration sensor 1172 may comprise an accelerometer. Accelerometers that may be suitable in some applications are commercially available from Motorola.

Figure 11:
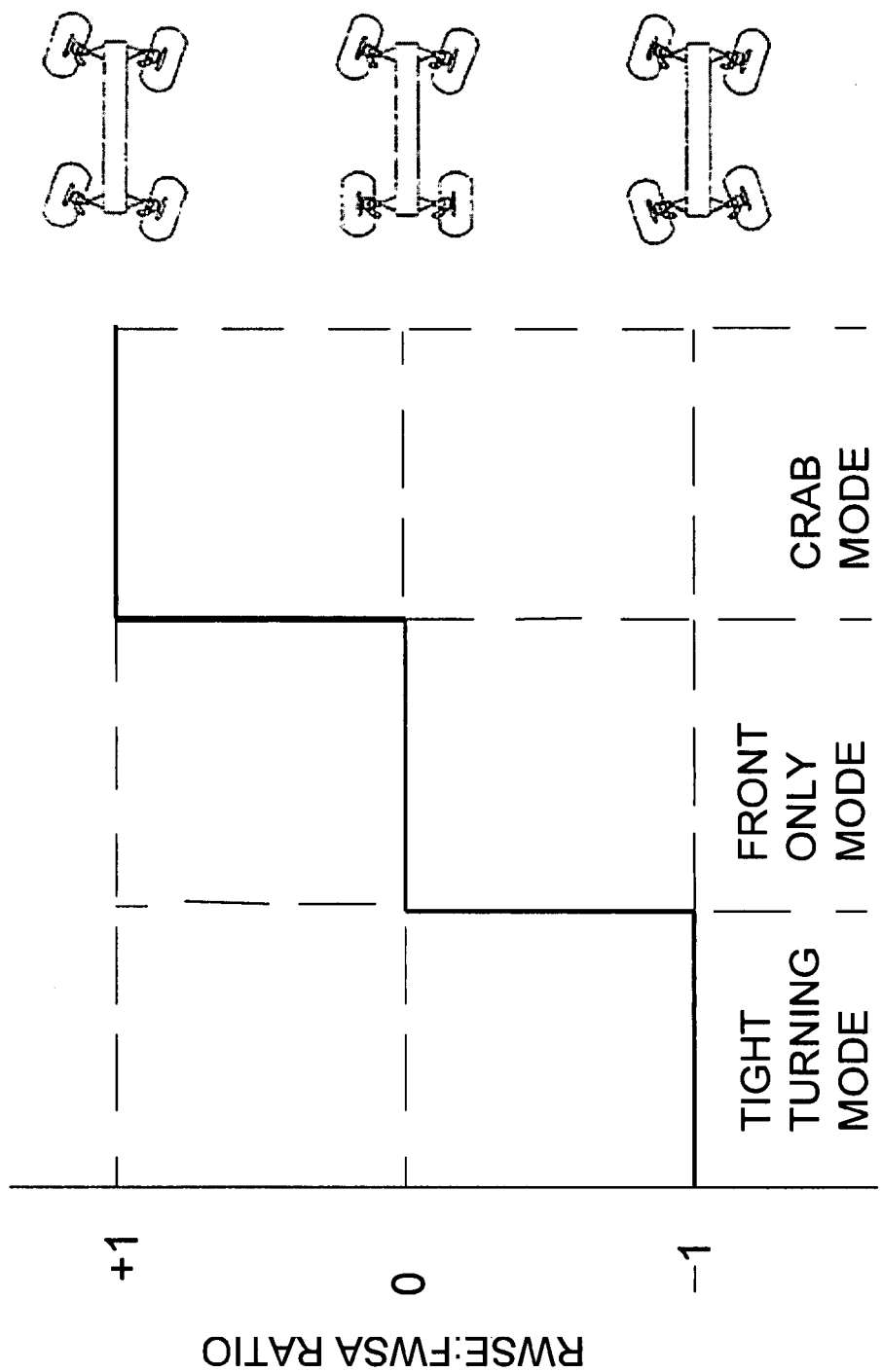
FIG. 11 is a diagram illustrating a plurality of steering modes.

FIG. 11 is a diagram illustrating a plurality of steering modes. A ratio of the rear wheel steering angle (RWSA) to the front wheel steering angle (FWSA) is shown for each of the steering modes. With reference to FIG. 11, it may be appreciated that when the vehicle is operating in the crab steering mode, the rear wheels rotate about a steering axis in a same-phase relationship with the front wheels (i.e., each rear wheel rotates about its steering axis in a clockwise direction when each front wheel is rotating about its steering axis in a clockwise direction).

Accordingly, the RWSA:FWSA ratio is equal to about one in the embodiment of FIG. 11 when the vehicle is operating in the crab steering mode. In FIG. 11, it may also be appreciated that when the vehicle is operating in the tight turning radius steering mode, the rear wheels and the front wheels rotate about their corresponding steering axes in an opposite phase relationship (i.e., each rear wheel rotates about its steering axis in a clockwise direction when each front wheel is rotating about its steering axis in a counter clockwise direction). When the vehicle is operating in the front only steering mode the RWSA:FWSA ratio is equal to about zero.

Figure 12:
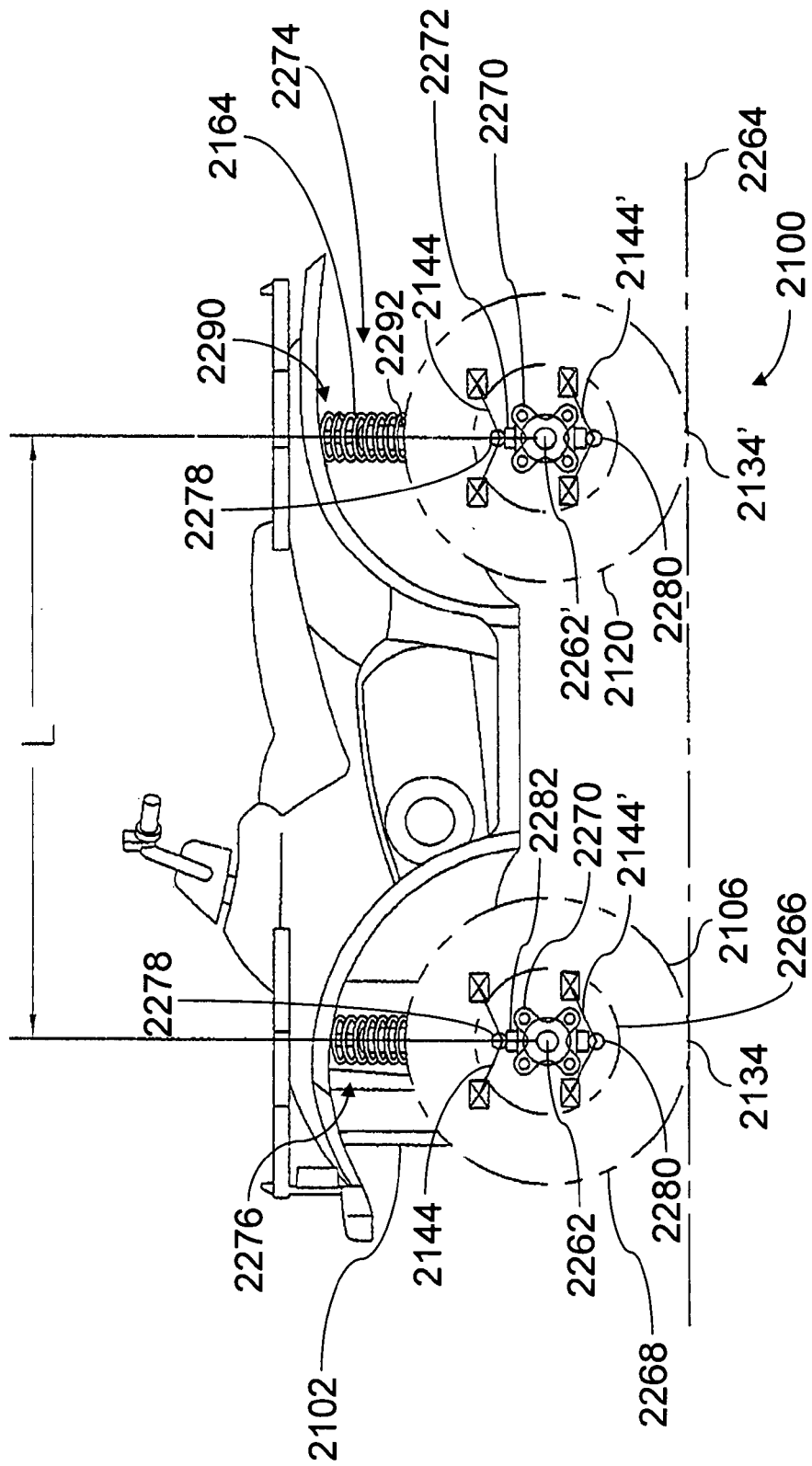
FIG. 12 is a side view of a vehicle in accordance with an exemplary embodiment of the present invention.

FIG. 12 is a side view of a vehicle 2100 in accordance with an exemplary embodiment of the present invention. Vehicle 2100 of FIG. 12 preferably includes two front wheels and two rear wheels. A left front wheel 2106 and a left rear wheel 2120 of vehicle 2100 are visible in FIG. 12. Left front wheel 2106 and left rear wheel 2120 have a pivoting axis 2262 and a pivoting axis 2262' respectively. In the embodiment of FIG. 12, pivoting axis 2262 of left front wheel 2106 is separated from the pivoting axis 2262' of left rear wheel 2120 by a wheel base distance L. The momentary contact points of the wheels define a wheel contract plane 2264. In FIG. 12, it may be appreciated that left front wheel 2106 and left rear wheel 2120 have a momentary contact point 2134 and a momentary contact point 2134' respectively.

In the embodiment of FIG. 12, each wheel comprises a rim 2266 and a tire 2268. Rim 2266 of each wheel is fixed to a hub 2270. Hub 2270 of left rear wheel 2120 is rotatably supported by a left rear knuckle 2272. In the embodiment of FIG. 12, left rear knuckle 2272 is coupled to a chassis 2102 of vehicle 2100 by a left rear suspension 2274.

Left rear suspension 2274 of FIG. 12 includes an upper arm 2144 and a lower arm 2144'. In the embodiment of FIG. 12, upper arm 2144 is rotatably coupled to chassis 2102 of vehicle 2100 so as to rotate about an upper a rotational axis. Also in the embodiment of FIG. 12, lower arm 2144' is coupled to chassis 2102 so as to rotate about a lower rotational axis. Left rear knuckle 2272 is coupled to upper arm 2144 of suspension 2276 at an upper connection 2278. In FIG. 12 it may also be appreciated that left rear knuckle 2272 is coupled to a lower arm 2144 of suspension 2276 at a lower connection 2280.

Vehicle 2100 of FIG. 12 also includes a left front suspension 2276 including an upper arm 2144 and a lower arm 2144'. In the embodiment of FIG. 12, upper arm 2144 is rotatably coupled to chassis 2102 of vehicle 2100 so as to rotate about an upper a rotational axis. Also in the embodiment of FIG. 12, lower arm 2144' is coupled to chassis 2102 so as to rotate about a lower rotational axis. An upper portion of left front knuckle 2282 is coupled to upper arm 2144 of left front suspension 2276 at an upper connection 2278. In FIG. 12 it may also be appreciated that a lower portion of left front knuckle 2282 is coupled to a lower arm 2144 of suspension 2276 at a lower connection 2280.

In a preferred embodiment, the front suspensions and the rear suspensions of vehicle 2100 are adapted to deflect so that each front wheel 2288 and each rear wheel 2286 can travel between a full compression position and a full extension position. In the embodiment of FIG. 12, front wheels 2288 and rear wheel 2286 are shown in an intermediate position lying between the full extension position and the full compression position. Various intermediate positions are possible without deviating from the spirit and scope of the present invention. For example, one intermediate position may be found when vehicle 2100 is at rest and the weight of vehicle 2100 is supported at least in part by the front suspensions and the rear suspensions. Another example of an intermediate position may be found when vehicle 2100 is at rest and the weight of both a rider and vehicle 2100 are supported at least in part by the front suspension and the rear suspension. In the embodiment of FIG. 12, each suspension includes a spring assembly 2290 including a spring 2164 that is disposed about a shock absorber 2292.

Figure 13:
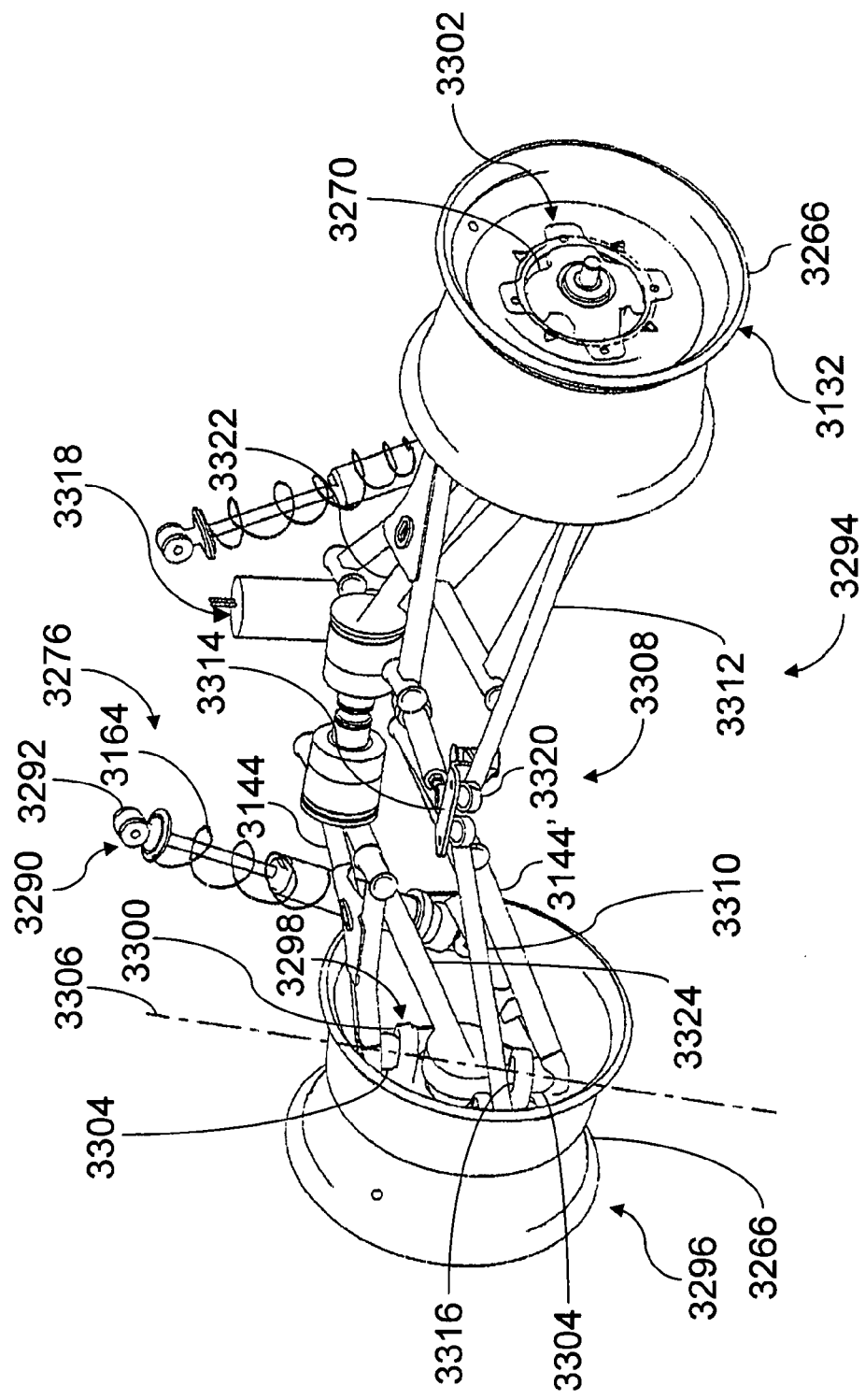
FIG. 13 is a perspective view of an assembly in accordance with an exemplary embodiment of the present invention.

FIG. 13 is a perspective view of an assembly 3294 in accordance with an exemplary embodiment of the present invention. Assembly 3294 includes a right wheel 3132 and a left wheel 3296. In the embodiment of FIG. 13, each wheel comprises a rim 3266. It will be appreciated that each wheel may also include a tire that is not shown in FIG. 13.

Right wheel 3132 of assembly 3294 is supported by a right wheel carrier 3302 comprising a hub 3270. Also in the embodiment of the FIG. 13, left wheel 3296 is supported by a left wheel carrier 3298 comprising a left knuckle 3300. In a preferred embodiment, each wheel carrier comprises a hub that is rotatably supported by a knuckle. For example, a bearing may be disposed within a bore defined by the knuckle and a cylindrical portion of the hub may be received by an inner bore of the bearing.

Left knuckle 3300 may be coupled to a frame of a vehicle by a left suspension 3276 including a left upper arm 3144 and a left lower arm 3144'. In the exemplary embodiment of FIG. 13, a distal end of left upper arm 3144 is coupled to an upper portion of left knuckle 3300 at a ball joint 3304. Also in the exemplary embodiment of FIG. 13, a distal end of lower arm 3144' is coupled to a lower portion of left knuckle 3300 at a ball joint 3304.

Ball joints 3304 preferably provide three rotational degrees of freedom. The rotational degrees of freedom provided by ball joints 3304 allow left suspension 3276 to move between a full compression position and a full extension position and at the same time allow left knuckle 3300 to rotate about a steering axis 3306. In the embodiment of FIG. 13, suspension 3276 is shown in an intermediate position lying between the full extension position and the full compression position. In the exemplary embodiment of FIG. 13, steering axis 3306 is shown intersecting the center of left upper ball joint 3304 and the center of left lower ball joint 3304.

Assembly 3294 also comprises a steering system 3308 that is preferably configured to selectively urge rotation of left knuckle 3300 about steering axis 3306. Steering system 3308 includes a left tie rod 3310, a right tie rod 3312, and a idler 3314. An inner end of left tie rod 3310 is pivotally coupled to idler 3314 in the exemplary embodiment of FIG. 13. An outer end of left tie rod 3310 is pivotally coupled to a protrusion 3316 of left knuckle 3300. In the embodiment of FIG. 13, an actuator 3318 is connected to idler 3314.

Left suspension 3276 also includes a left spring assembly 3290 having a first end rotatably coupled to left lower arm 3144'. A second end of left spring assembly 3290 may be rotatably coupled to a vehicle frame. In the embodiment of FIG. 13, each spring assembly includes a shock absorber 3292 and a spring 3164 that is disposed about shock absorber 3292.

Right tie rod 3312 of steering system 3308 includes an inner joint 3320 and an outer joint (not visible in FIG. 13). Right tie rod 3312 may be pivotally coupled to right wheel carrier 3302 so as to rotate right wheel about a steering axis. In FIG. 13 it may also be appreciated that right tie rod 3312 is pivotally coupled to idler 3314 at inner joint 3320.

In FIG. 13, a distal portion of a right drive axle 3322 can be seen extending beyond right hub 3270. In the embodiment of FIG. 13, right drive axle 3322 is preferably connected to right hub 3270 so as to drive right wheel 3132. A left drive axle 3324 is also shown in FIG. 13. Proximal ends of left drive axle 3324 and right drive axle 3322 may be connected to a drive train of a vehicle.

Figure 14:
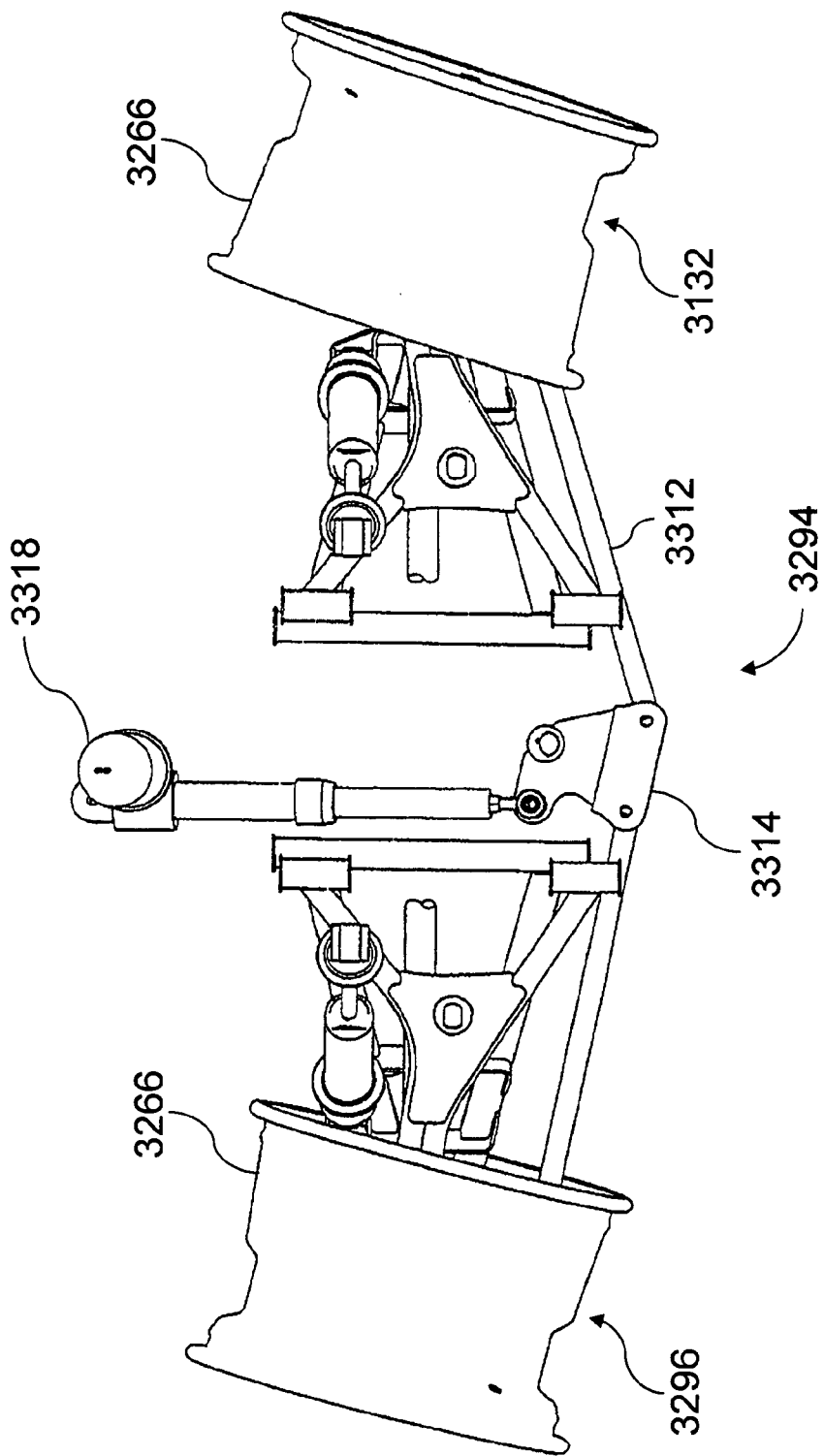
FIG. 14 is a plan view of assembly shown in the previous figure.

FIG. 14 is a plan view of assembly 3294 shown in the previous figure. In FIG. 14, actuator 3318 can be seen connecting to idler 3314. In the embodiment of FIG. 14, actuator 3318 is adapted to rotate idler 3314 about an idler pivot axis. It is to be appreciated that actuator 3318 may comprise various elements without deviating from the spirit and scope of the present invention. Examples of elements that may be suitable in some applications include hydraulic actuators, balls screws, electric motors, gears, linkages, levers, and the like.

A right tie rod 3312 and a left tie rod 3310 may also be seen connecting with idler 3314 in FIG. 14. A distal end of right tie rod 3312 is preferably pivotally coupled to a wheel carrier supporting a right wheel 3132. A left wheel 3296 is also visible in FIG. 14. In the embodiment of FIG. 14, each wheel comprises a rim 3266. It will be appreciated that each wheel may also include a tire that is not shown in FIG. 14.

Figure 15:
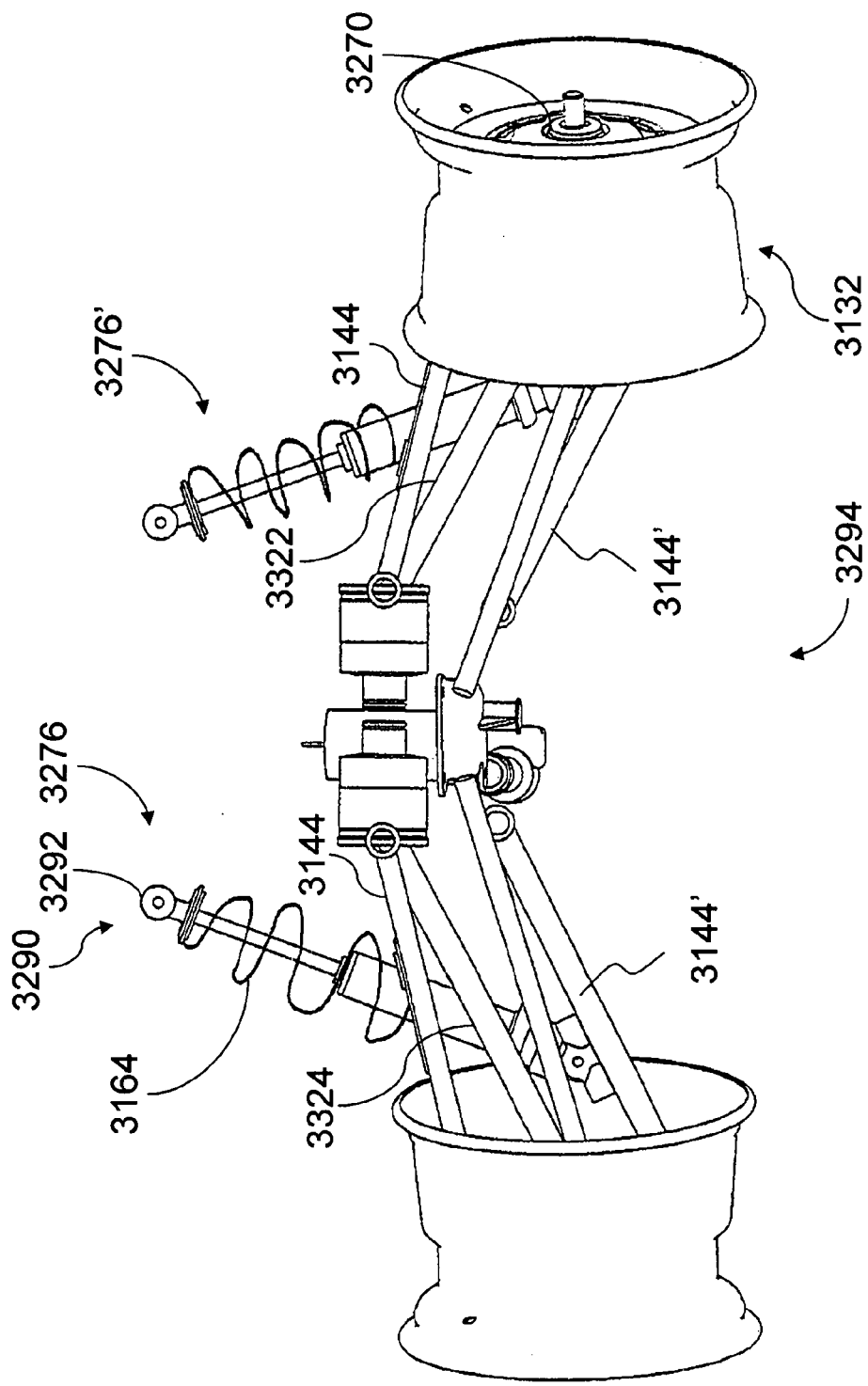
FIG. 15 is an additional plan view of assembly shown in the previous figure.

FIG. 15 is an elevation view of assembly 3294 shown in the previous figure. In FIG. 15, a first end of left spring assembly 3290 is shown rotatably coupled to a left lower arm 3144' of left suspension 3276. A second end of left spring assembly 3290 may be rotatably coupled to a vehicle frame. In the embodiment of FIG. 15, each spring assembly includes a shock absorber 3292 and a spring 3164 that is disposed about shock absorber 3292.

Right suspension 3276' and left suspension 3276 each include an upper arm 3144 and a lower arm 3144'. In FIG. 15, a distal portion of a right drive axle 3322 can be seen extending beyond a right hub 3270. In the embodiment of FIG. 15, right drive axle 3322 is preferably connected to right hub 3270 so as to drive right wheel 3132. A left drive axle 3324 is also shown in FIG. 15. Proximal ends of left drive axle 3324 and right drive axle 3322 may be connected to a drive train of a vehicle.

Figure 16:
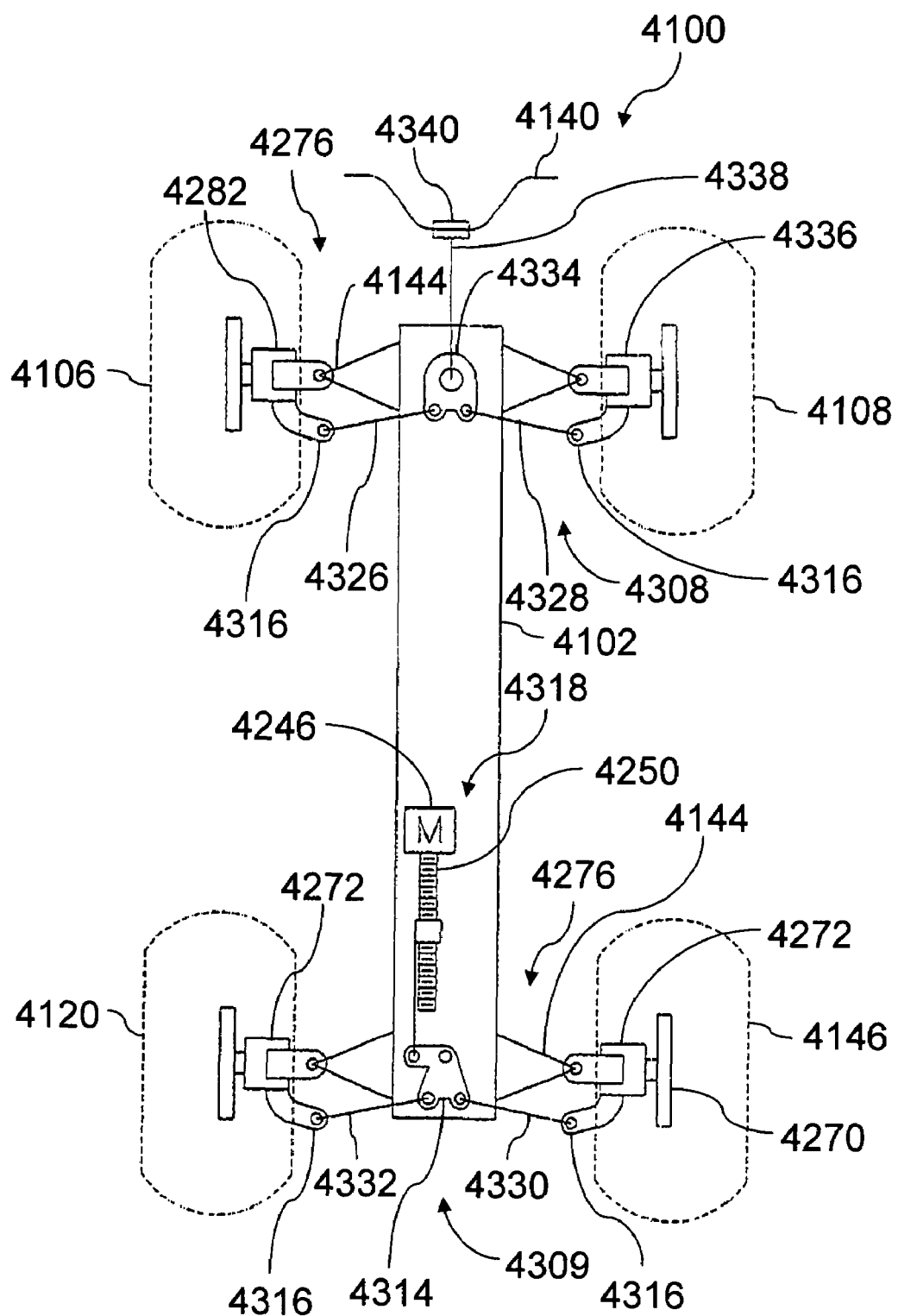
FIG. 16 is a diagrammatic plan view of a vehicle in accordance with an exemplary embodiment of the present invention.

FIG. 16 is a diagrammatic plan view of a vehicle 4100 in accordance with an exemplary embodiment of the present invention. Vehicle 4100 of FIG. 16 includes a left front wheel 4106, a right front wheel 4108, a left rear wheel 4120, and a right rear wheel 4146. In FIG. 16, each wheel is fixed to a hub 4270 that is rotatably supported by a knuckle. In FIG. 16 it may also be appreciated that each knuckle is coupled to a chassis 4102 of vehicle 4100 by a suspension 4276. Also in the embodiment of FIG. 16, each suspension 4276 comprises an arm 4144 that is rotatably coupled to chassis 4102.

Vehicle 4100 also includes a front steering system 4308 and a rear steering system 4309. Front steering system 4308 includes a left front tie rod 4326 and a right front tie rod 4328. In FIG. 16 it may be appreciated that left front tie rod 4326 is connected to a protrusion 4316 of a left front knuckle 4282 at an outer joint. In the embodiment of FIG. 16 left front tie rod 4326 is also connected to a bell crank 4334 at an inner joint.

In FIG. 16 it may be appreciated that right front tie rod 4328 has a proximal end and a distal end. The distal end of right front tie rod 4328 is connected to a protrusion 4316 of a right front knuckle 4336 and the proximal end of right front tie rod 4328 is connected to bell crank 4334.

Bell crank 4334 of front steering system 4308 is fixed to a proximal portion of a steering shaft 4338. A handlebar 4140 is fixed to a distal end of steering shaft 4338 using mounting blocks 4340. In the embodiment of FIG. 16, left front wheel 4106 and right front wheel 4108 can be turned by rotating handlebar 4140.

Rear steering system 4309 of vehicle 4100 includes a left rear tie rod 4332, a right rear tie rod 4330, and an idler 4314. In FIG. 16 it may be appreciated that left rear tie rod 4332 is connected to a protrusion 4316 of left rear knuckle 4272 at an outer joint. In the embodiment of FIG. 16 left rear tie rod 4332 is connected to idler 4314 at an inner joint. In FIG. 16 it may be appreciated that right rear tie rod 4330 has a proximal end and a distal end. The distal end of right rear tie rod 4330 is connected to a protrusion 4316 of a right rear knuckle 4272 and the proximal end of right rear tie rod 4330 is connected to idler 4314.

An actuator 4318 is coupled to idler 4314 in the embodiment of FIG. 16. It is to be appreciated that actuator 4318 may comprise various elements without deviating from the spirit and scope of the present invention. In the embodiment of FIG. 16, actuator 4318 comprises a lead screw 4250 and an electric motor 4246. In this exemplary embodiment, the orientation of the rear wheels relative to chassis 4102 of vehicle 4100 can be changed by activating motor 4246. In some advantageous embodiments of the present invention, the orientation of the rear wheels relative to chassis 4102 of vehicle 4100 remains fixed when motor 4246 is de-activated.

Figure 17:
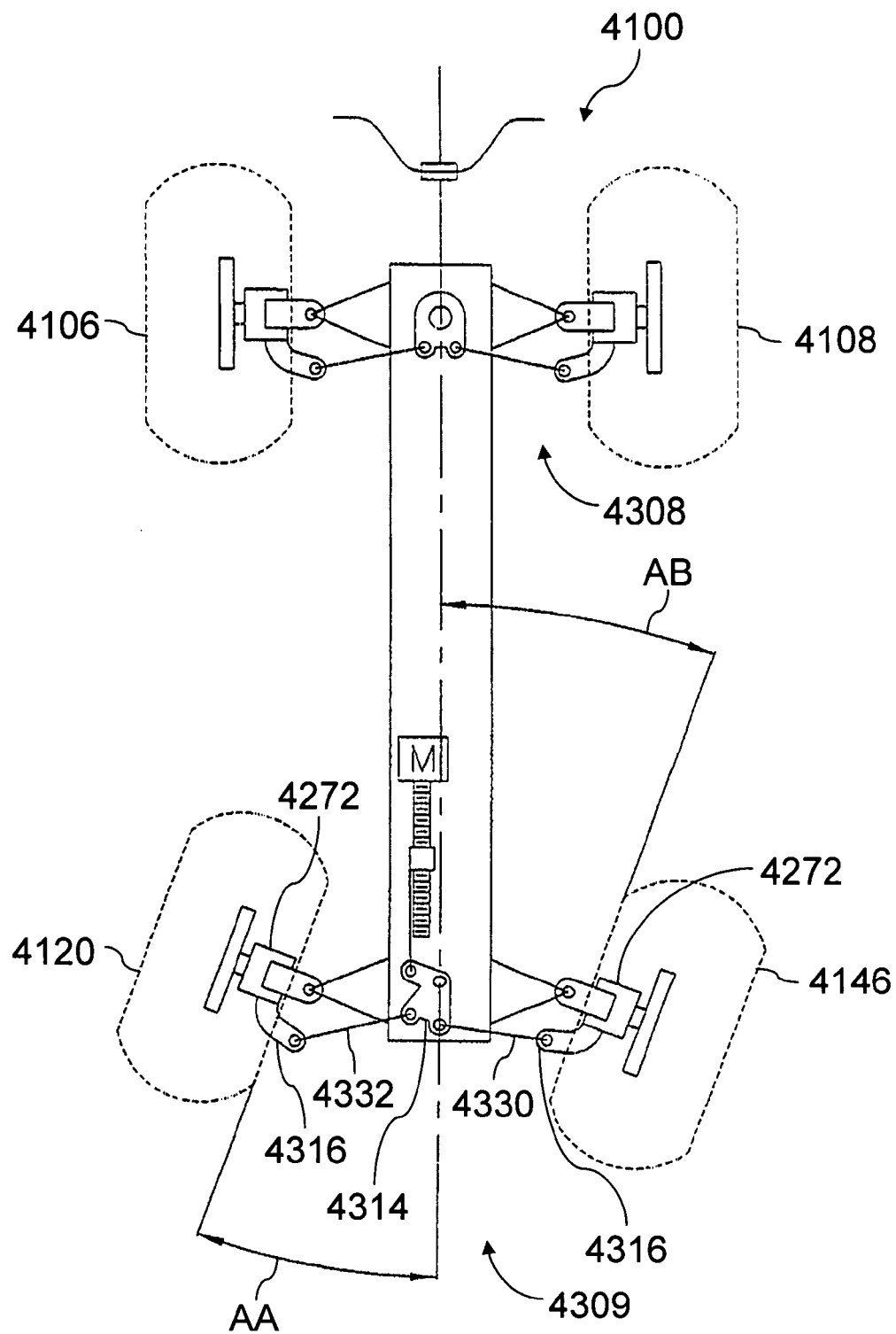
FIG. 17 is an additional diagrammatic plan view of the vehicle shown in the previous figure.

FIG. 17 is an additional diagrammatic plan view of vehicle 4100 shown in the previous figure. In the embodiment of FIG. 17, idler 4314 of rear steering system 4309 has been rotated so that left rear wheel 4120 and right rear wheel 4146 have both assumed a generally angled orientation. More particularly, left rear wheel 4120 is positioned such that a plane defined by an inner surface of left rear wheel 4120 defines an angle AA with a longitudinal axis 4206 of chassis 4102 of vehicle 4100 in the embodiment of FIG. 17. In FIG. 17 it may also be appreciated that longitudinal axis 4206 and a plane defined by an inner surface of right rear wheel 4146 defines an angle AB.

In some embodiments of the present invention, rear steering system 4309 is adapted so that left rear wheel 4120 and right rear wheel 4146 can be selectively locked in various angled positions. In these exemplary embodiments, front steering system 4308 may be utilized to rotate left front wheel 4106 and right front wheel 4108 about their respective steering axes so that vehicle 4100 travels in a desired direction.

Rear steering system 4309 of vehicle 4100 includes a left rear tie rod 4332, a right rear tie rod 4330, and an idler 4314. In FIG. 17 it may be appreciated that left rear tie rod 4332 is connected to a protrusion 4316 of left rear knuckle 4272 at an outer joint. In the embodiment of FIG. 17 left rear tie rod 4332 is connected to idler 4314 at an inner joint. In FIG. 17 it may be appreciated that right rear tie rod 4330 has a proximal end and a distal end. The distal end of right rear tie rod 4330 is connected to a protrusion 4316 of a right rear knuckle 4272 and the proximal end of right rear tie rod 4330 is connected to idler 4314.

Figure 18:
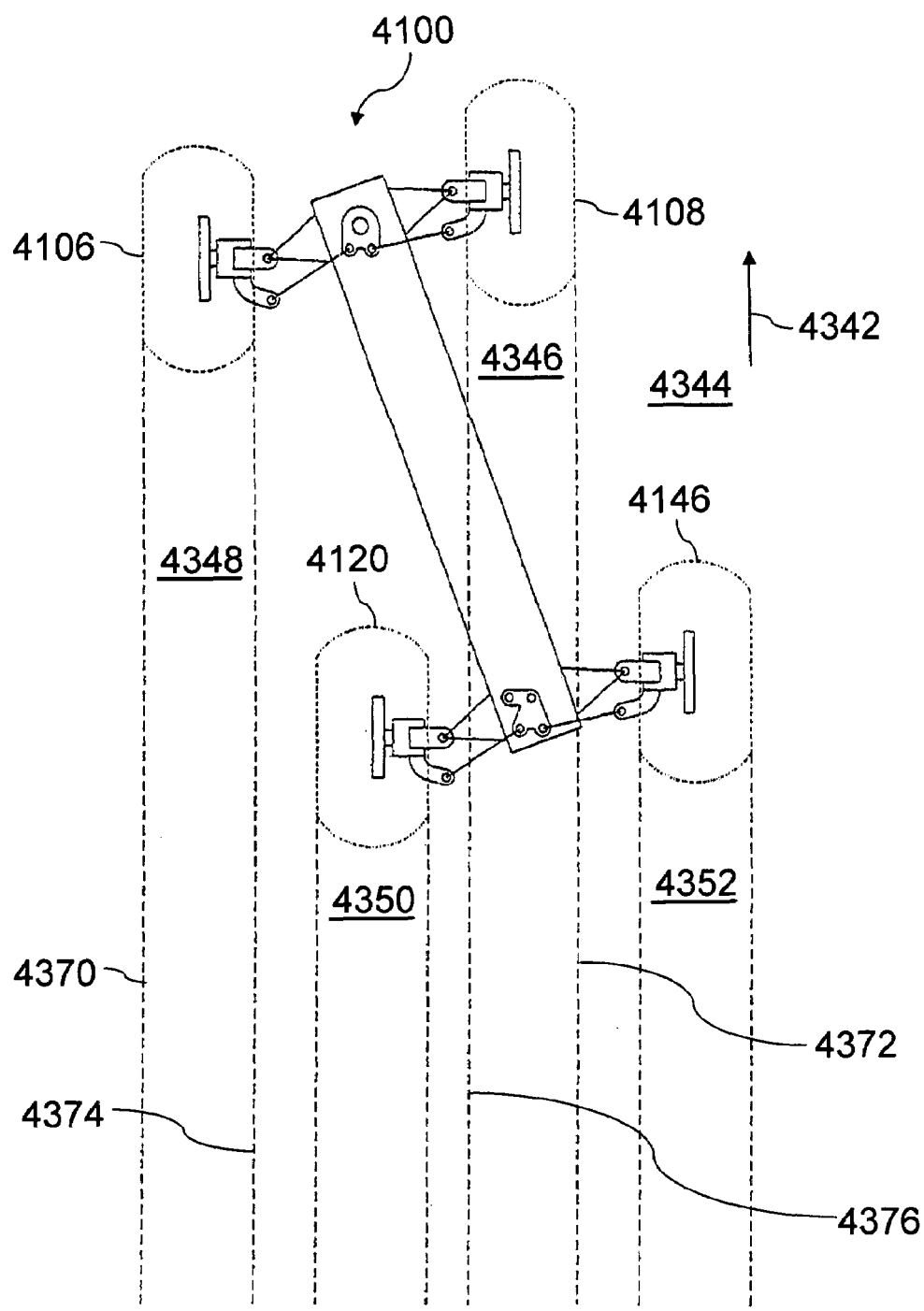
FIG. 18 is an additional diagrammatic view of the vehicle shown in the previous figure.

FIG. 18 is an additional diagrammatic view of vehicle 4100 shown in the previous figure. In the embodiment of FIG. 18, left front wheel 4106 and right front wheel 4108 have been rotated about their respective steering axes and vehicle 4100 is shown traveling in forward direction 4342 across a surface 4344. In FIG. 18, right front wheel 4108 and left front wheel 4106 are shown traveling along a right front wheel path 4346 and a left front wheel path 4348 respectively. In FIG. 18, it may be appreciated that left rear wheel path 4350 of left rear wheel 4120 is disposed between an outer edge 4370 of left front wheel path 4348 of left front wheel 4106 and an outer edge 4372 of right front wheel path 4346 of right front wheel 4108. In FIG. 18, it may be appreciated that left rear wheel path 4350 of left rear wheel 4120 is disposed between an inner edge 4374 of left front wheel path 4348 of left front wheel 4106 and an inner edge 4376 of right front wheel path 4346 of right front wheel 4108.

Figure 19:
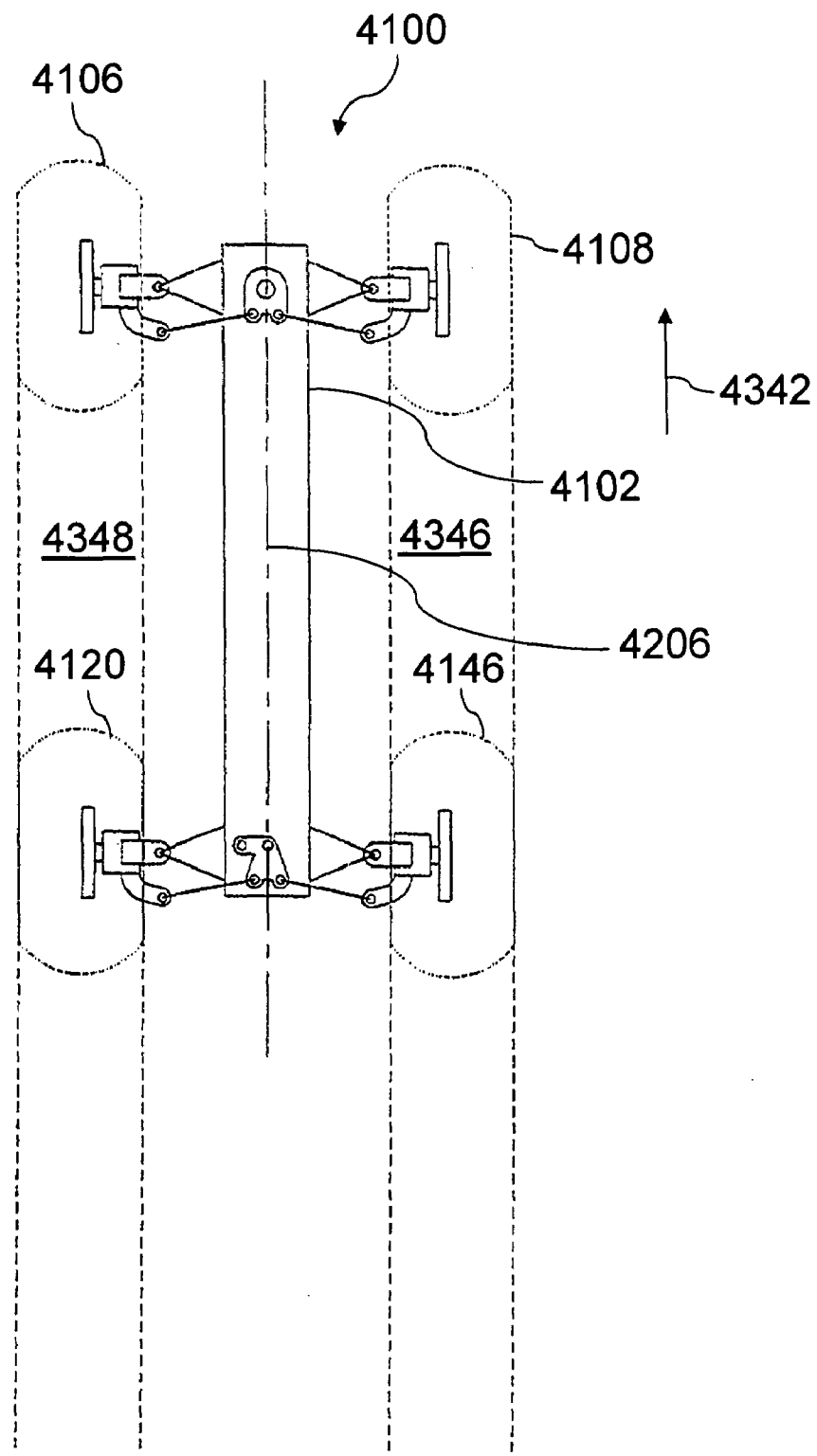
FIG. 19 is an additional diagrammatic view of the vehicle shown in the previous figure.

FIG. 19 is an additional diagrammatic view of vehicle 4100 shown in the previous figure. In the embodiment of FIG. 19 vehicle 4100 is traveling in a forward direction 4342. Also in the embodiment of FIG. 19, a plane defined by an inner surface of left front wheel 4106 and a plane defined by an inner surface of right front wheel 4108 are both generally parallel to a longitudinal axis 4206 of chassis 4102. Additionally, a plane defined by an inner surface of left rear wheel 4120 and a plane defined by an inner surface of right rear wheel 4146 are both generally parallel to a longitudinal axis 4206 of chassis 4102 in the embodiment of FIG. 19.

In FIG. 19, it may be appreciated that right front wheel 4108 travels along a right front wheel path 4346 when vehicle 4100 is traveling in forward direction 4342. In FIG. 19, right rear wheel 4146 is shown following the path of right front wheel 4108. In FIG. 19, it may also be appreciated that left front wheel 4106 travels along a left front wheel path 4348 when vehicle 4100 is traveling in a forward direction 4342 and left rear wheel 4120 is shown following the path of left front wheel 4106.

Figure 20:
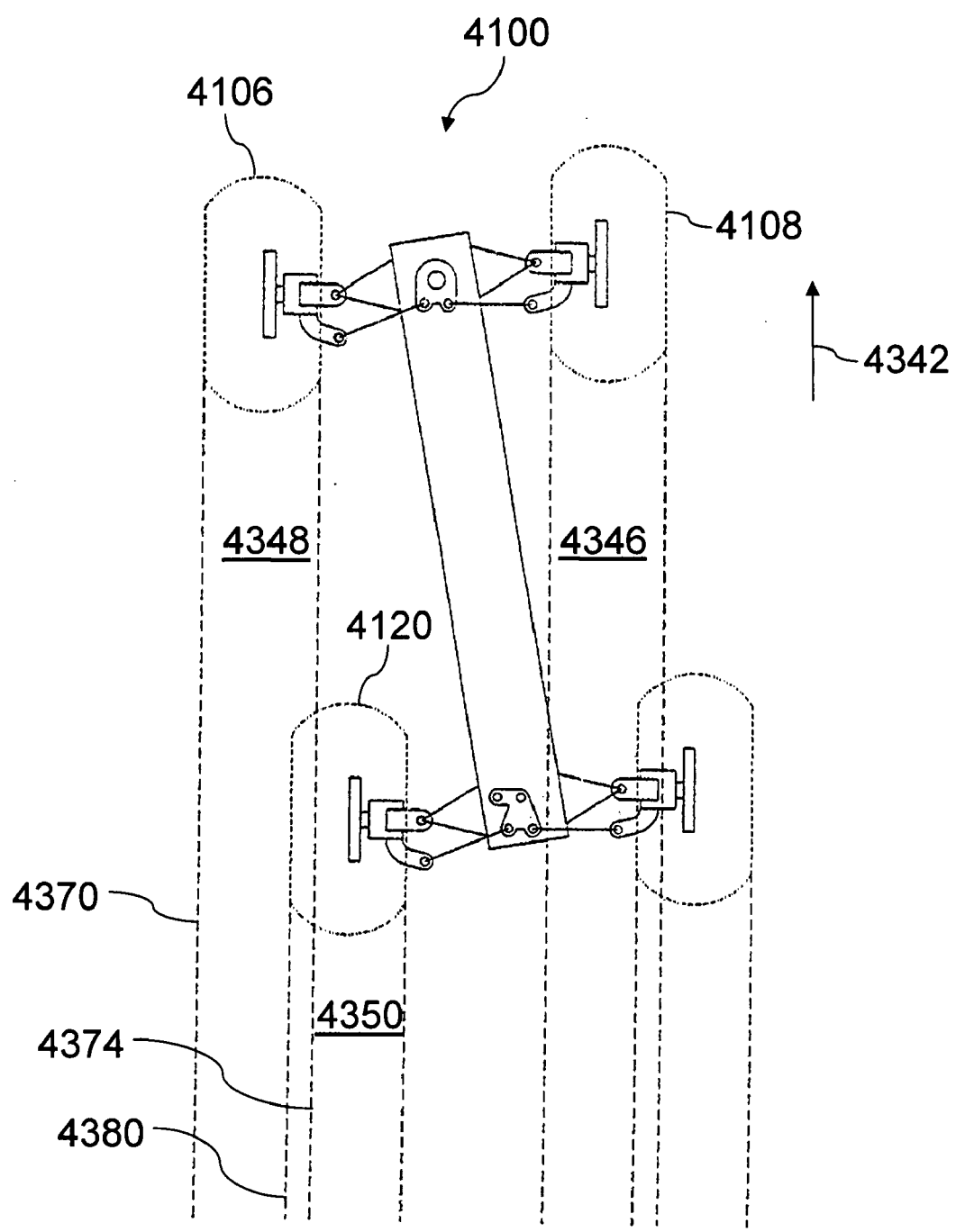
FIG. 20 is an additional diagrammatic view of the vehicle shown in the previous figure.

FIG. 20 is an additional diagrammatic view of vehicle 4100 shown in the previous figure. In the embodiment of FIG. 20, vehicle 4100 is traveling in a forward direction 4342 with left front wheel 4106 traveling along a left front wheel path 4348 and right front wheel 4108 traveling along a right front wheel path 4346. In the embodiment of FIG. 20 an outer edge 4380 of left rear wheel path 4350 of left rear wheel 4120 is disposed between an outer edge 4370 of left front wheel path 4348 of left front wheel 4106 and an inner edge 4374 of a left front wheel path 4348 of left front wheel 4106.

Figure 21:
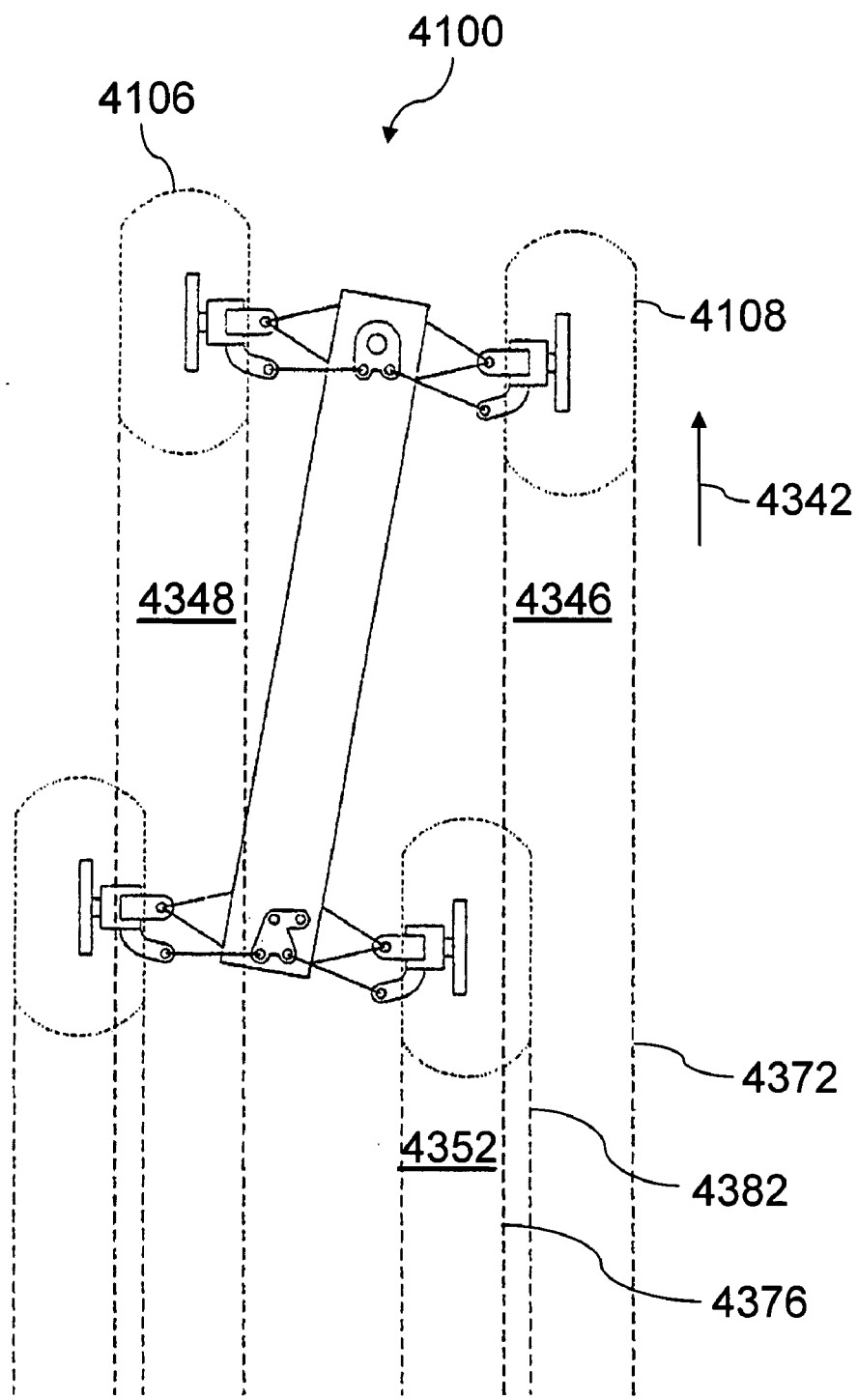
FIG. 21 is an additional diagrammatic view of the vehicle shown in the previous figure.

FIG. 21 is an additional diagrammatic view of vehicle 4100 shown in the previous figure. In the embodiment of FIG. 21, vehicle 4100 is traveling in a forward direction 4342 with left front wheel 4106 traveling along a left front wheel path 4348 and right front wheel 4108 traveling along a right front wheel path 4346. In the embodiment of FIG. 21, an outer edge 4382 of right rear wheel path 4352 of right rear wheel 4146 is disposed between an outer edge 4372 of right front wheel path 4346 of right front wheel 4108 and an inner edge 4376 of right front wheel path 4346 of right front wheel 4108.

Figure 22:
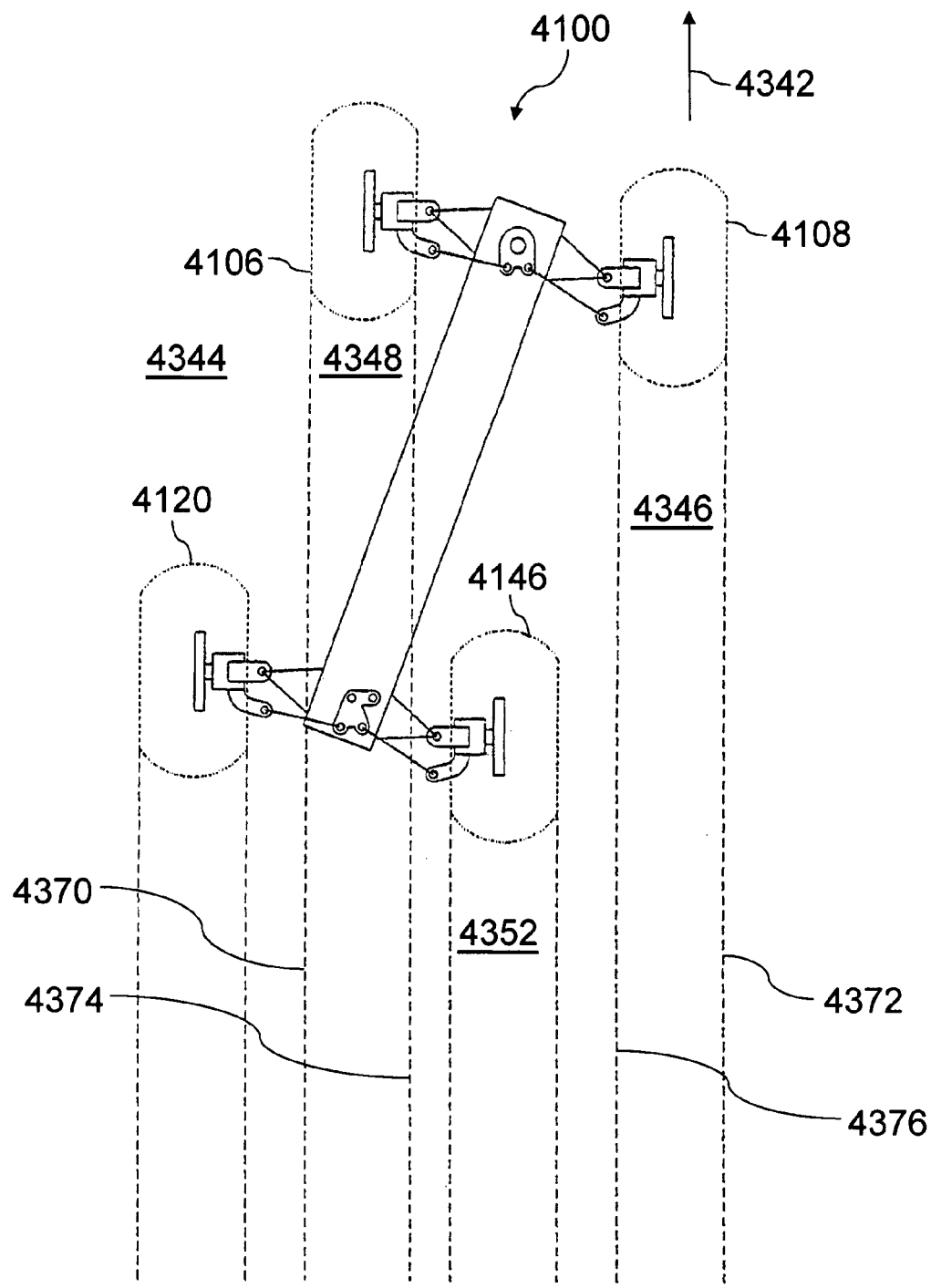
FIG. 22 is an additional diagrammatic view of the vehicle shown in the previous figure.

FIG. 22 is an additional diagrammatic view of vehicle 4100 shown in the previous figure. In the embodiment of FIG. 22, left front wheel 4106 and right front wheel 4108 have been rotated about their respective steering axes and vehicle 4100 is shown traveling in forward direction 4342 across a surface 4344. In FIG. 22, right front wheel 4108 and left front wheel 4106 are shown traveling along a right front wheel path 4346 and a left front wheel path 4348 respectively. In FIG. 22, it may be appreciated that a right rear wheel path 4352 of right rear wheel 4146 is disposed between an outer edge 4370 of left front wheel path 4348 of left front wheel 4106 and an outer edge 4372 of right front wheel path 4346 of right front wheel 4108. In FIG. 22, it may be appreciated that right front wheel path 4346 of right rear wheel 4146 is disposed between an inner edge 4374 of left front wheel path 4348 of left front wheel 4106 and an inner edge 4376 of left front wheel path 4348 of right front wheel 4108.

Figure 23:
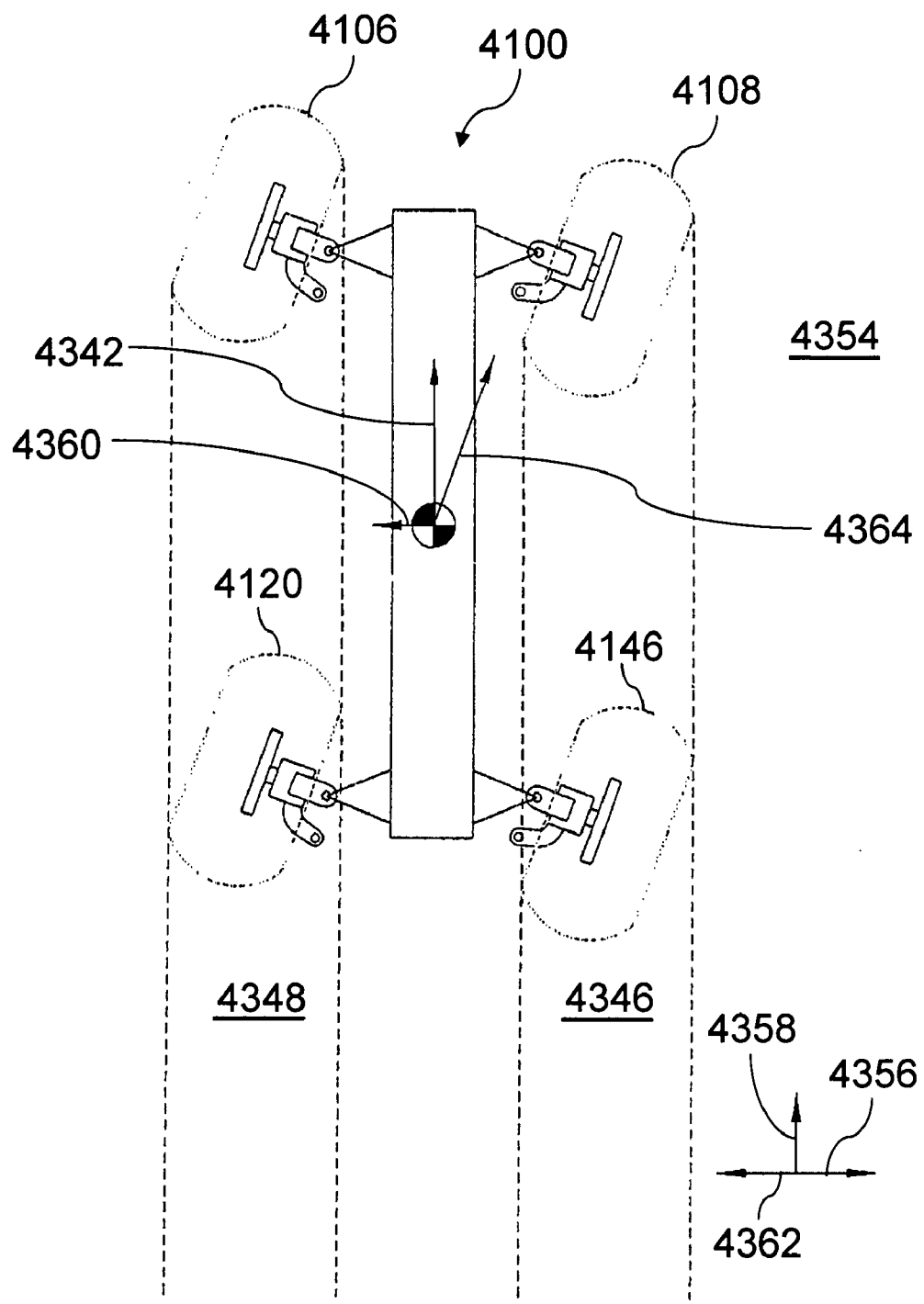
FIG. 23 is an additional diagrammatic view of the vehicle shown in the previous figure.

FIG. 23 is an additional diagrammatic view of vehicle 4100 shown in the previous figure. In the embodiment of FIG. 23, vehicle 4100 is traveling in a forward direction 4342 with left front wheel 4106 traveling along a left front wheel path 4348 and right front wheel 4108 traveling along a right front wheel path 4346. In the embodiment of FIG. 23, a vehicle 4100 is shown resting on a hill 4354 having an uphill direction 4356. A side hilling direction 4358 is also illustrated in FIG. 23. In the embodiment of FIG. 23, side hilling direction 4358 is substantially perpendicular to uphill direction 4356. In FIG. 23 a gravity force 4360 is shown acting on vehicle 4100. Gravity force 4360 tends to urge vehicle 4100 is a down hill direction 4362.

In the embodiment of FIG. 23, left front wheel 4106, right front wheel 4108, left rear wheel 4120 and right rear wheel 4146 are all oriented in a somewhat uphill direction. The rotation of the wheels creates a drive force 4364 that is illustrated with an arrow in FIG. 23. In FIG. 23 it may be appreciated that drive force 4364 is oriented in a somewhat uphill direction. In the exemplary embodiment of FIG. 23, vehicle 4100 is shown traveling in a forward direction 4342 due to the application of drive force 4364 and gravity force 4360 on vehicle 4100. In the embodiment of FIG. 23, forward direction 4342 is generally parallel to side hilling direction 4358.

It is to be appreciated that methods and apparatus in accordance with the present invention may be used in conjunction with various types of suspension systems without deviating from the spirit and scope of the present invention. Examples of suspension systems that may be suitable in some applications include double A-arm suspensions, McPherson strut suspensions, trailing arm suspensions, and multi-link suspensions (e.g., four link suspensions).

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A method for activating one of a plurality of rear wheel steering modes for a vehicle traveling on the ground and having a rear wheel and a front wheel, each rotatable about a corresponding steering axis, the method comprising the steps of:

providing a handlebar rotatably supported by a chassis of the vehicle and a switch disposed on an arm of the handlebar;

providing an operator input signal, via the switch, to a controller of the vehicle;

sensing a degree of slippage between the ground and at least one of the rear and front wheels using one or more sensors;

comparing the degree of slippage to a threshold parameter; and providing an enabling signal to the controller when the degree of slippage is greater than the threshold, the controller selecting and activating one of the rear wheel steering modes when the input signal and the enabling signal are received.

2. The method of claim 1, wherein:

the switch is disposed proximate a grip; and the switch and the grip are positioned and dimensioned such that the switch can be actuated by a thumb of a hand while another portion of the hand remains in contact with the grip.

3. The method of claim 1, wherein:

the switch is disposed proximate a grip; and the switch and the grip are positioned and dimensioned such that the switch can be actuated by a thumb of a hand while another portion of the hand grips the grip.

4. The method of claim 1, wherein the step of sensing a degree of slippage comprises the steps of:

providing a first vehicle position signal indicative of a position of the vehicle at a first time;

providing a second vehicle position signal indicative of a position of the vehicle at a second time; and comparing the first vehicle position signal and the second position signal for providing a vehicle displacement signal.

5. The method of claim 4, wherein the step of sensing a degree of slippage comprises the steps of:

providing a wheel displacement signal indicative of a linear displacement of a ground contacting portion of the wheel;

producing the enabling signal in response to a comparison of the vehicle displacement signal and the wheel displacement signal.

6. The method of claim 1, wherein the step of sensing a degree of slippage comprises the steps of:

providing a wheel velocity signal indicative of a linear velocity of a ground contacting portion of the wheel;

providing a vehicle velocity signal indicative of a velocity of the vehicle along a line of travel;

comparing the vehicle velocity signal and the wheel velocity signal.

7. The method of claim 1, wherein the step of sensing a degree of slippage comprises the steps of:

providing a wheel acceleration signal indicative of a linear acceleration of a ground contacting portion of the wheel;

providing a vehicle acceleration signal indicative of acceleration of the vehicle along a line of travel; and comparing the vehicle acceleration signal and the wheel acceleration signal.

8. The method of claim 1, further comprising the step of providing a first control signal and a second control signal from the controller, each of the control signals based on the selected rear wheel steering mode, the first control signal provided to a first actuator for turning a right rear wheel abut a first steering axis and the second control signal provide to a second actuator for turning a left rear wheel about a second steering axis.

9. The method of claim 8, wherein an angle indicated by the first control signal for turning the right rear wheel about the first steering axis is different from an angle indicated by the second control signal for turning the left rear wheel about the second steering axis.

10. The method of claim 1, wherein the one or more sensors include a left rear wheel angle sensor and a right rear wheel angle sensor.

11. The method of claim 1, wherein the one or more sensors include a vehicle roll angle sensor.

12. The method of claim 1, wherein the one or more sensors include a vehicle roll rate sensor.

13. The method of claim 1, wherein the one or more sensors include a first actuator sensor and a second actuator sensor.

14. A method for activating a rear wheel steering mode of an ATV while traversing variable terrain in the ATV, the ATV including at least one front wheel and at least one rear wheel, the method comprising:

selecting, via an operator input switch, one of a plurality of rear wheel steering modes; and enabling the activation of the selected rear wheel steering mode by: sensing the movement of the vehicle and providing a first riding parameter; sensing the movement of a ground contacting portion of at least one of the front and rear wheels and providing a second riding parameter; providing an enabling signal to a rear wheel controller based upon a comparison of the first riding parameter to the second riding parameter.

15. The method of claim 14, wherein the step of enabling the activation of the selected steering mode further includes sensing an angle of the at least one front wheel.

16. The method of claim 14, wherein the step of enabling the activation of the selected steering mode further includes sensing a vehicle roll angle.

17. The method of claim 14, wherein the enabling step further comprises the steps of:

providing a first vehicle position signal indicative of a position of the vehicle at a first time;

providing a second vehicle position signal indicative of a position of the vehicle at a second time; and comparing the first vehicle position signal and the second position signal for providing a vehicle displacement signal.

18. The method of claim 17, wherein the enabling step further comprises the steps of:

providing a wheel displacement signal indicative of a linear displacement of a ground contacting portion of the wheel; and producing the enabling signal in response to a comparison of the vehicle displacement signal and the wheel displacement signal.

19. The method of claim 14, wherein the enabling step further comprises the steps of:

providing a wheel velocity signal indicative of a linear velocity of a ground contacting portion of the wheel;

providing a vehicle velocity signal indicative of a velocity of the vehicle along a line of travel; and comparing the vehicle velocity signal and the wheel velocity signal.

20. The method of claim 14, wherein the enabling step further comprises the steps of:

providing a wheel acceleration signal indicative of a linear acceleration of a ground contacting portion of the wheel;

providing a vehicle acceleration signal indicative of acceleration of the vehicle along a line of travel; and comparing the vehicle acceleration signal and the wheel acceleration signal.

21. A method for selecting between and activating one of a plurality rear steering modes in a recreational vehicle, the vehicle having a first rear wheel, a second rear wheel, at least one front wheel and a steering member operably coupled to the at least one front wheel and adapted to be operated by the operator to steer the at least one front wheel about a front steering axis, the method comprising the steps of:

selecting one of the plurality of rear steering modes using an input device switch positioned on the steering member, the input device generating an input signal indicative of the selected rear steering mode;

generating a first riding parameter by sensing the linear acceleration of the vehicle using a vehicle acceleration sensor and generating a first parameter signal indicative of the first riding parameter;

generating a second riding parameter by sensing the acceleration of a ground contacting portion of at least one of the wheels using a wheel rotation sensor generating a second parameter signal indicative of the second riding parameter;

calculating any inconsistency between the first and second riding parameters using a comparator, the comparator receiving the first and second parameter signals;

comparing the inconsistency with a threshold parameter;

generating an enabling signal based on the comparison between the inconsistency and the threshold parameter; and controlling at least one actuator to selectively and independently rotate the first and second rear wheels about respective first and second rear steering axes in response to the enabling signal.

* * * * *